United States Patent
Kato et al.

(10) Patent No.: US 7,346,791 B2
(45) Date of Patent: Mar. 18, 2008

(54) METHOD FOR CONTROLLING A CLOCK FREQUENCY OF AN INFORMATION PROCESSOR IN ACCORDANCE WITH THE DETECTION OF A START AND A END OF A SPECIFIC PROCESSING SECTION

(75) Inventors: Kazuomi Kato, Otsu (JP); Masashige Mizuyama, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 494 days.

(21) Appl. No.: 10/808,438

(22) Filed: Mar. 25, 2004

(65) Prior Publication Data

US 2004/0193935 A1   Sep. 30, 2004

(30) Foreign Application Priority Data

Mar. 26, 2003   (JP) .............................. 2003-085042

(51) Int. Cl.
*G06F 1/00*   (2006.01)
(52) U.S. Cl. ...................... 713/322; 713/320; 713/323; 710/200
(58) Field of Classification Search ................ 713/320, 713/322, 323; 710/200
See application file for complete search history.

(56) References Cited

U.S. PATENT DOCUMENTS

| | | | |
|---|---|---|---|
| 5,189,647 A | | 2/1993 | Suzuki et al. |
| 5,237,694 A | * | 8/1993 | Horne et al. ................. 710/200 |
| 6,718,475 B2 | * | 4/2004 | Cai ............................. 713/323 |
| 6,826,705 B2 | * | 11/2004 | Tani ............................ 713/320 |
| 6,883,104 B2 | * | 4/2005 | Rosch ......................... 713/322 |

FOREIGN PATENT DOCUMENTS

| JP | 5-108191 | 4/1993 |
|---|---|---|
| JP | 8-76874 | 3/1996 |

\* cited by examiner

*Primary Examiner*—Chun Cao
*Assistant Examiner*—Sean Weinman
(74) *Attorney, Agent, or Firm*—Wenderoth, Lind & Ponack, L.L.P.

(57) ABSTRACT

A clock controller controls a clock generated by a clock generator to determine a clock frequency. A computing device executes software obtained from a storage in accordance with the clock supplied via the clock controller. An exclusive processing section detector detects the start and end of an exclusive processing section which is a section during which an exclusive processing is executed. A clock control judging device commands the clock controller to decrease the clock frequency if the exclusive processing section detector has detected the start of a specific processing section, while commanding the clock controller to decrease the clock frequency if the exclusive processing section detector has detected the end of the specific processing section.

26 Claims, 13 Drawing Sheets

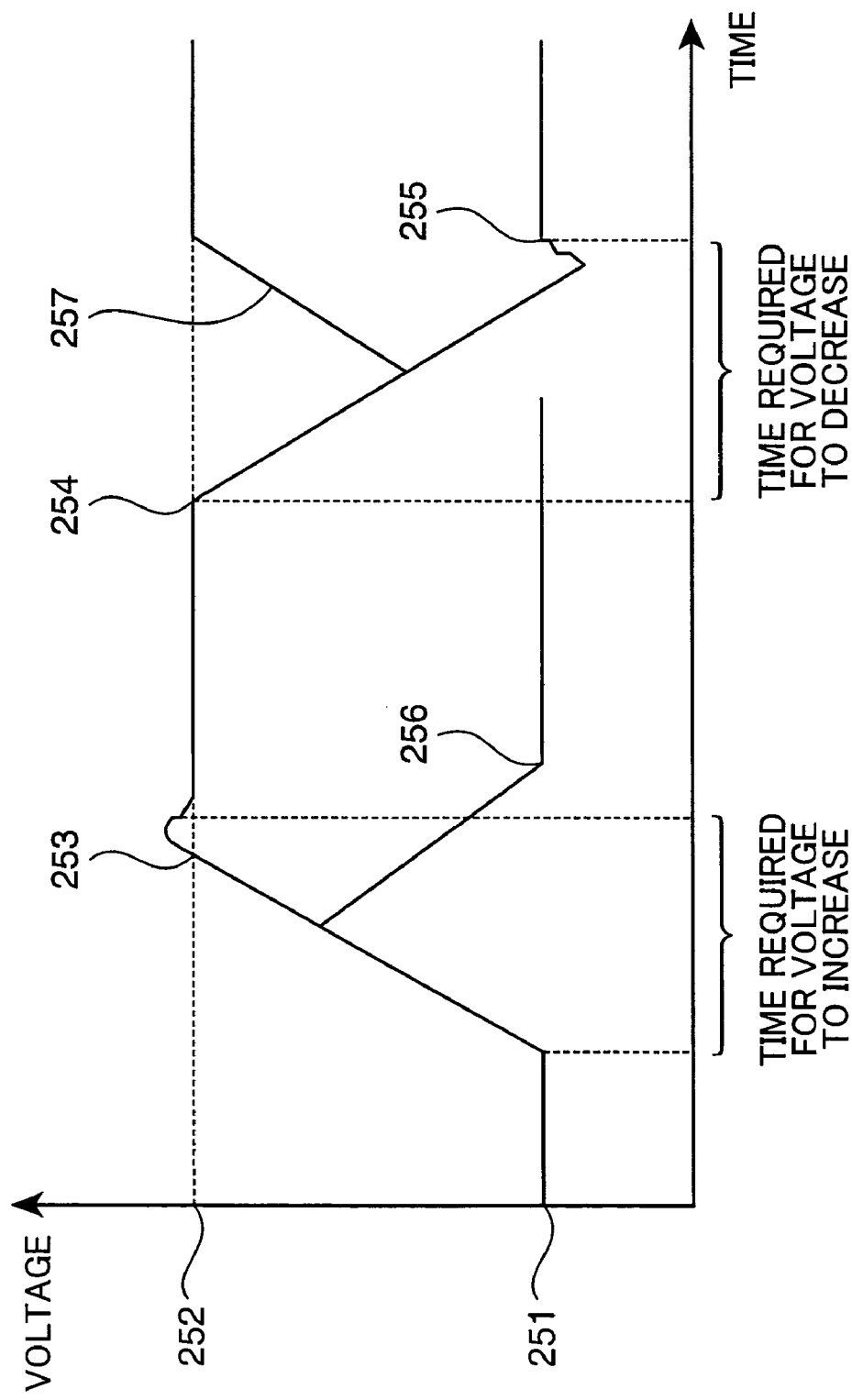

FIG.9

| FROM STARTING POINT OF EXCLUSIVE PROCESSING SECTION TO CORRESPONDING ENDING POINT (STARTING POINT→ENDING POINT) (#: ID NUMBER) 301 | LAST EXECUTION TIME (μ sec) 302 | TOTAL EXECUTION TIME AND TOTAL NUMBER OF TIMES OF EXECUTIONS (TOTAL μ sec/TIMES) 303 | AVERAGE EXECUTION TIME (μ sec) 304 |
|---|---|---|---|
| START OF INTERRUPT PROHIBITION #1 →END OF INTERRUPT PROHIBITION #1 | 97.50 | 13858.70/140 | 98.99 |
| START OF INTERRUPT PROHIBITION #2 →END OF INTERRUPT PROHIBITION #2 | 0.71 | 1820.05/252 | 0.72 |
| START OF INTERRUPT PROHIBITION #3 →END OF INTERRUPT PROHIBITION #3 | 63.68 | 25893.11/389 | 66.56 |
| ... | ... | ... | ... |
| START OF PREEMPT PROHIBITION #1 →END OF PREEMPT PROHIBITION #1 | 36.07 | 3598.64/103 | 34.98 |
| START OF PREEMPT PROHIBITION #2 →END OF PREEMPT PROHIBITION #2 | 7.72 | 4035.54/481 | 8.39 |
| | ... | ... | ... |

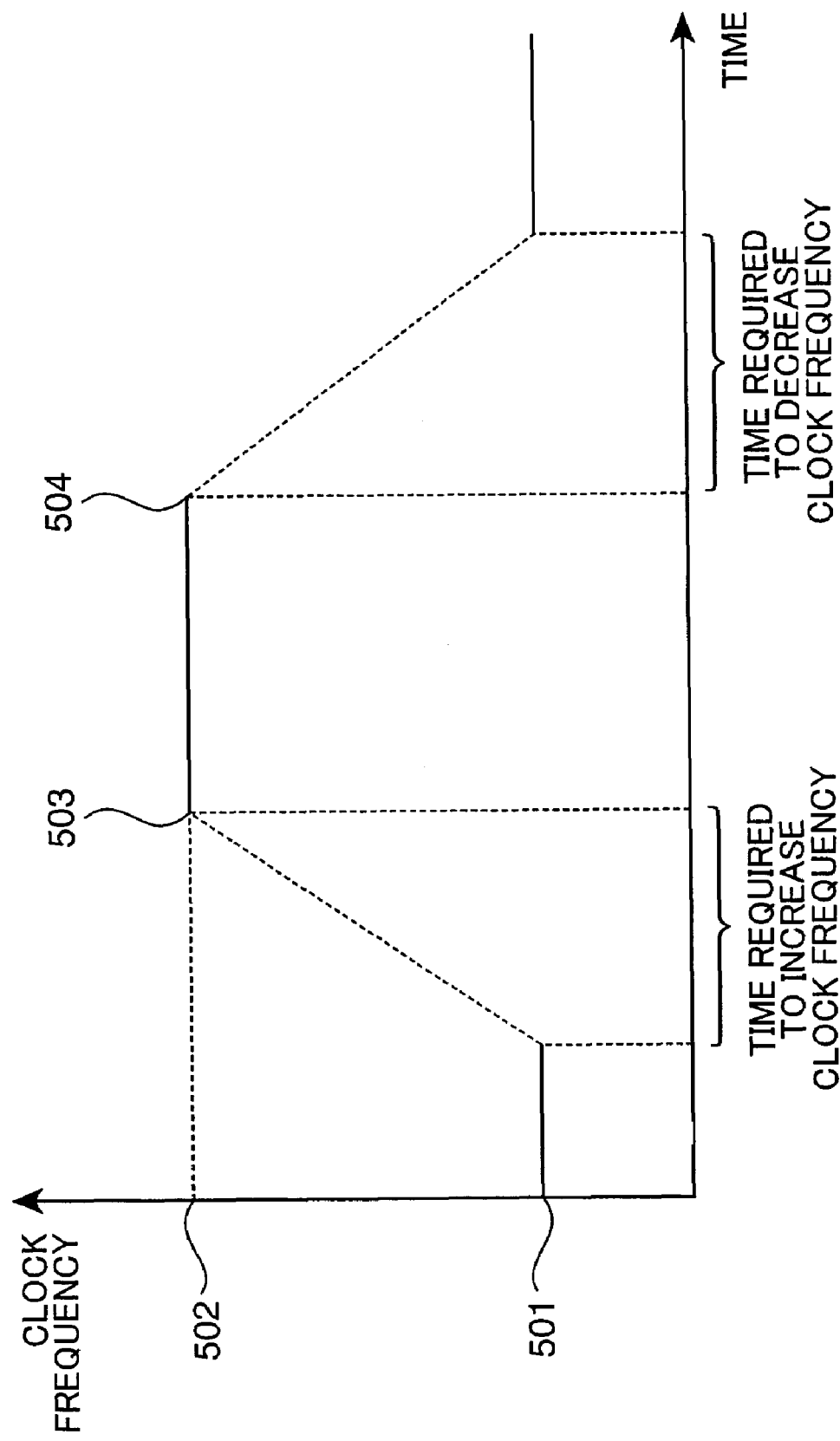

FIG.12

| FROM ENDING POINT OF EXCLUSIVE PROCESSING SECTION TO STARTING POINT OF NEXT EXCLUSIVE PROCESSING SECTION (ENDING POINT → STARTING POINT) (#: ID NUMBER) 401 | LAST EXECUTION TIME (μ sec) 402 | TOTAL EXECUTION TIME AND TOTAL NUMBER OF TIMES OF EXECUTIONS (TOTAL μ sec/TIMES) 403 | AVERAGE EXECUTION TIME (μ sec) 404 |
|---|---|---|---|
| END OF INTERRUPT PROHIBITION #1 → START OF INTERRUPT PROHIBITION #1 | 523.83 | 25108.37 / 54 | 464.97 |
| END OF INTERRUPT PROHIBITION #1 → START OF INTERRUPT PROHIBITION #2 | 452.65 | 58876.98 / 132 | 446.04 |
| END OF INTERRUPT PROHIBITION #1 → START OF PREEMPT PROHIBITION #1 | 825.11 | 134891.93 / 159 | 848.38 |
| ... | ... | ... | ... |
| END OF INTERRUPT PROHIBITION #2 → START OF INTERRUPT PROHIBITION #1 | 73.89 | 5625.04 / 31 | 181.45 |
| END OF INTERRUPT PROHIBITION #2 → START OF INTERRUPT PROHIBITION #2 | 1125.89 | 74390.57 / 88 | 845.34 |
| ... | ... | ... | ... |
| END OF PREEMPT PROHIBITION #1 → START OF INTERRUPT PROHIBITION #1 | 4.06 | 38.50 / 8 | 4.86 |
| END OF PREEMPT PROHIBITION #1 → START OF INTERRUPT PROHIBITION #2 | 4.86 | 4035.54 / 771 | 5.23 |
| ... | ... | ... | ... |

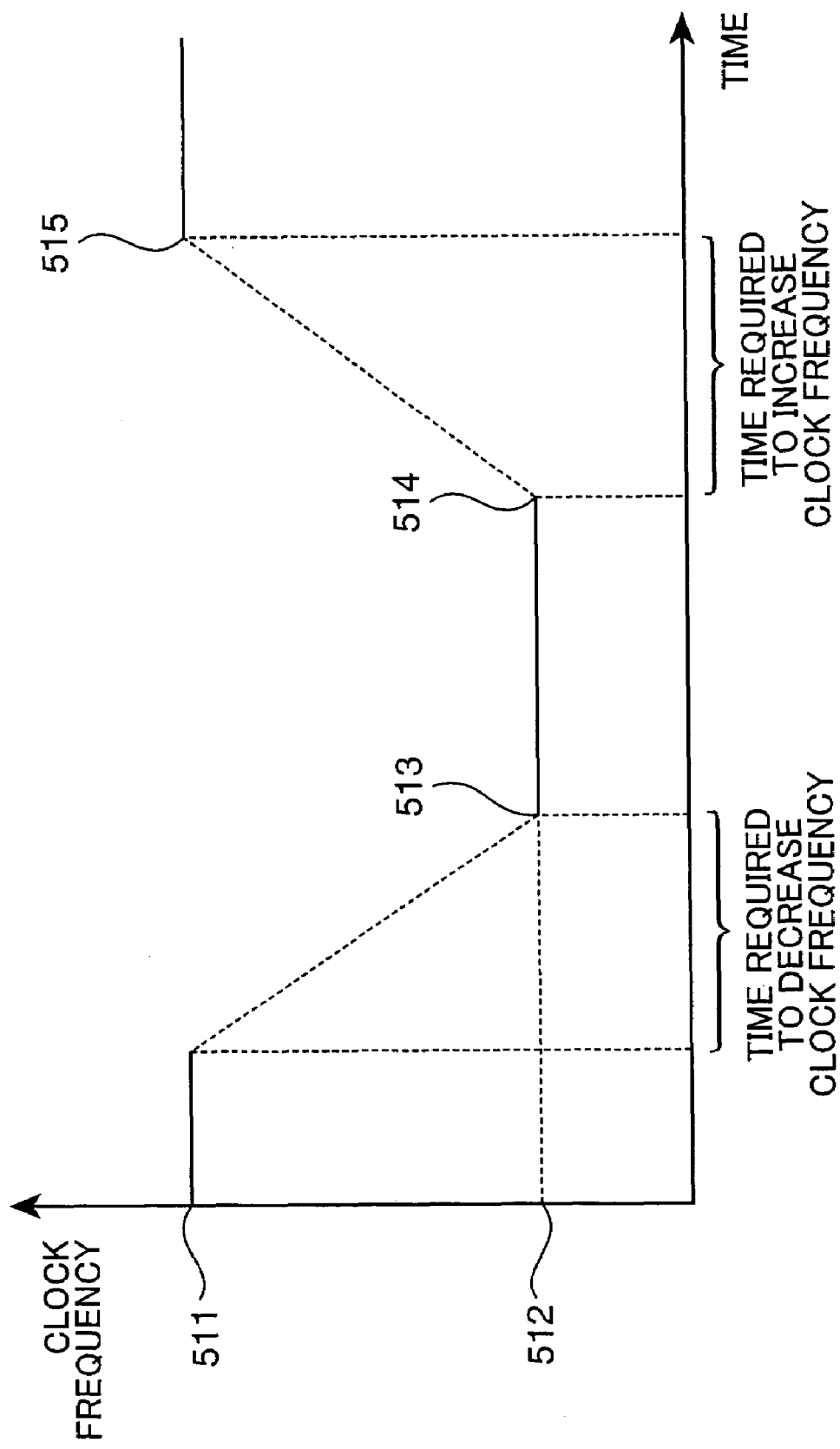

METHOD FOR CONTROLLING A CLOCK FREQUENCY OF AN INFORMATION PROCESSOR IN ACCORDANCE WITH THE DETECTION OF A START AND A END OF A SPECIFIC PROCESSING SECTION

BACKGROUND OF THE INVENTION

1. Field of the Invention

The present invention relates to a power-save control for an information processing apparatus, an electrical apparatus, a clock controlling method for the information processing apparatus, a clock controlling program and a program product. More particularly, the present invention relates to a technology for reducing power consumption by controlling a clock frequency.

2. Description of the Related Art

There is a large demand to suppress power consumption to a lower level in existing household apparatus such as mobile phones, mobile audio equipments and digital cameras. Many processors including a CPU (central processing unit) are incorporated into existing household apparatus. Power consumption tends to increase since many software applications operate simultaneously in these processors, and a display or display device that consumes a large amount of power is provided. Thus, technology for suppressing power consumption has come to be required.

A technology for controlling a clock frequency, which is the frequency of a clock fed to the information processing apparatus, in accordance with a state of the information processing apparatus, has been known as a technology for suppressing power consumption by an information processing apparatus. One of such known prior art technologies is such that the frequency of a clock specially fed to a CPU, which normally operates at a lower clock frequency, is increased only during an external interrupt period and a succeeding specific period (for example, see Japanese Unexamined Patent Publication No. H05-108191). According to this technology, the clock frequency is controlled by referring to hardware on a device whose interrupt flag is set.

There is also known a technology according to which minimum performances required by tasks are set as prerequisites, and are set in a setting circuit so that a clock frequency is controlled in accordance with the performances upon activating each task (for example, see Japanese Unexamined Patent Publication No. H08-76874).

There is further known a technology of constantly preparing a task of decreasing a clock frequency with a lowest degree of priority in a multi-task operating system (for example, see Japanese Unexamined Patent Publication No. H04-278612). According to this technology, the consumption of power is suppressed by decreasing the clock frequency when the processings of all the other tasks are completed, i.e., when a system enters a standby state.

However, it is necessary to enable the proper operation of the apparatus at the same time that the power consumption of a household apparatus is suppressed, and many of the processors provided in the household apparatuses are required to have a real-time operability. The real-time operability is for guaranteeing that a processing is executed within a specified period after such processing is requested. Since the request of no other processing is received in a section during which an exclusive processing is executed, e.g., in a section during which the execution of other processing is prohibited while a certain processing is being executed, there is a danger of impairing the real-time operability. Therefore, the section during which an exclusive processing is executed has to be as short as possible.

The prior art technology disclosed in Japanese Unexamined Patent Publication No. H05-108191 is designed to increase the clock frequency during the external interrupt period, and presents a problem that the power consumption is always high and no power-save control can be executed in real time during the external interrupt period. The prior art technology disclosed in Japanese Unexamined Patent Publication No. H08-76874 is designed for the control of the clock frequency in accordance with the performances required by the respective tasks, and presents a problem that the performances required by the respective tasks need to be determined and set beforehand. Further, since the prior art technology disclosed in Japanese Unexamined Patent Publication No. H04-278612 is designed to decrease the clock frequency when the processings of all the other tasks are completed, it presents a problem that the power consumption is high until all the other tasks are completed and no power-save control can be executed in real time.

SUMMARY OF THE INVENTION

In view of the problems residing in the prior art, an object of the present invention is to provide an information processing apparatus, an electrical apparatus provided with such an information processing apparatus, a clock controlling method for such an information processing apparatus, a clock controlling program and a program product, which enable a reduction in power consumption while ensuring a real-time operability.

In order to accomplish the above object, one aspect of the present invention is directed to an information processing apparatus, wherein a clock control judging device commands a clock controller to increase a clock frequency if a specific processing section detector has detected the start of the specific processing section while commanding the clock controller to decrease the clock frequency if the specific processing section detector has detected the end of the specific processing section. A computing device implements software stored in a storage in accordance with the clock controlled by the clock controller.

These and other objects, features and advantages of the present invention will become more apparent upon a reading of the following detailed description and accompanying drawings.

BRIEF DESCRIPTION OF THE DRAWINGS

FIG. 8 is a graph showing a relationship between voltage and time, FIG. 9 is a table showing exclusive processing sections during which an exclusive processing is executed and information on past execution times of these sections, FIG. 11 is a graph showing a relationship between clock frequency and time, FIG. 12 is a table showing information on past execution times of processing sections between the end of exclusive processing sections and the start of the next ones, FIG. 14 is a graph showing a relationship between clock frequency and time.

DETAILED DESCRIPTION OF THE PREFERRED EMBODIMENTS

Hereinafter, embodiments of the present invention are described with reference to the accompanying drawings.

First Embodiment

Figure 1:
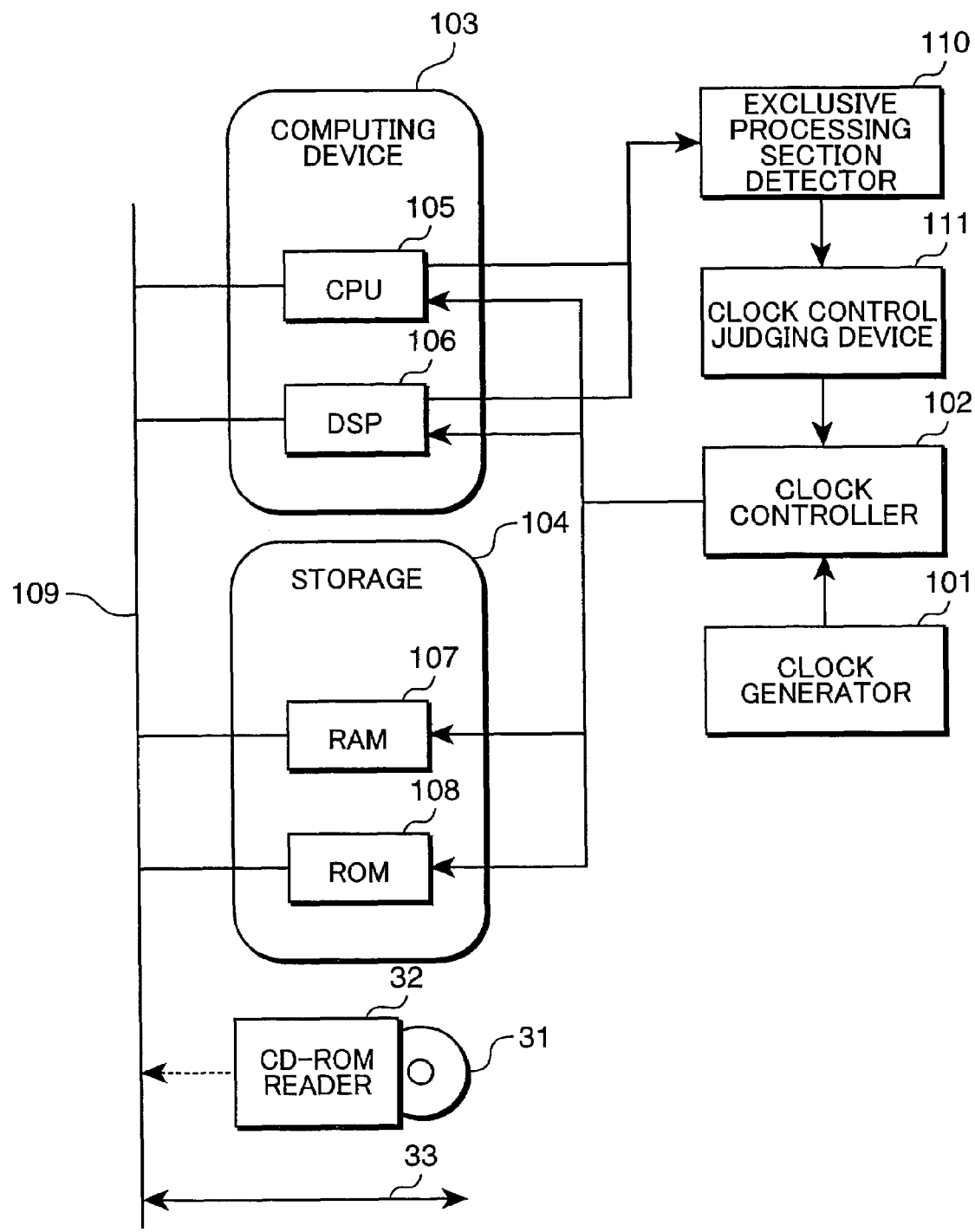
FIG. 1 is a block diagram showing a construction of an information processing apparatus according to a first embodiment of the invention.

FIG. 1 is a block diagram showing a construction of an information processing apparatus according to a first embodiment of present invention. In FIG. 1, a clock generator 101 is an oscillating circuit for generating a clock in a specified cycle. Clocks generated in the clock generator 101 serve as a source of clocks to be fed to a computing device 103 and a storage 104 in the information processing apparatus.

A clock controller 102 frequency-divides the clock generated in the clock generator 101 by a frequency-dividing function or a frequency-dividing circuit to control the frequency of the clock generated in the clock generator 101. For example, a frequency x of the clock generated in the clock generator 101 is divided by m (m is a natural number), and a clock having a frequency of x/m is outputted.

The clock controller 102 may be realized by a method of increasing the clock generated in the clock generator 101 instead of adopting a method of frequency division.

The clock outputted from the clock controller 102 serves as a clock to be fed to the computing device 103 and the storage 104 in the information processing apparatus.

Although the same clock is fed to the computing device 103 and the storage 104 in FIG. 1, separate clocks, i.e., asynchronous clocks, may be fed to the computing device 103 and the storage 104. Alternatively separate clocks may be fed to each of a CPU 105 and a DSP 106 constructing the computing device 103. In order to realize such a construction, a plurality of clock generators 101 and a plurality of clock controllers 102 are provided to separately generate clocks, or one clock generator 101 is provided and the clock controller 102 includes a plurality of frequency-dividing circuits to generate a plurality of clocks having different frequencies.

The computing device 103 is a processor for executing a program and a computation in accordance with the clock fed from the clock controller 102. This processor includes, for example, the CPU 105 and the DSP 106 shown in FIG. 1. The CPU 105 is a central processing unit, and the DSP 106 is a digital signal processor for executing a specific computation at a high speed. The computing device 103 may be realized by multiple processors.

The storage 104 is adapted to store software (i.e., a program) implemented in the information processing apparatus and data necessary to operate the information processing apparatus. The storage 104 is, for example, comprised of a RAM 107, a ROM 108, etc. The storage 104 may be realized by a secondary storage device or a detachable storage medium. A floppy disk or a hard disk may be provided as a magnetic storage medium, and a CD, a MD and a DVD may be provided as an optical storage medium. The storage 104 may also be an internal RAM, a register or a cache provided in the processor.

A bus 109 connects the respective elements (CPU 105, DSP 106) of the computing device 103 with the respective elements (RAM 107, ROM 108) of the storage 104. Software and data are transferred via the bus 109.

The above-described software and data can also be supplied via a storage medium 31 such as the ROM 108 or a flexible disk or a CD-ROM, or via a transmission medium 33 such a telephone circuit or a network. In FIG. 1, a CD-ROM is shown as the storage medium 31, and a telephone circuit is shown as the transmission medium 33. The software and the data stored in the CD-ROM can be read by connecting a CD-ROM reader 32 as an external device of the information processing apparatus with the bus 109, and can be saved in the RAM 107 or an unillustrated hard disk. In the case of supplying the software and the data in the form of the ROM 108 as the storage medium 31, the information processing apparatus can execute a processing in accordance with the software and the data by loading the ROM 108 into the information processing apparatus. The software and the data supplied via the transmission medium 33 are received via the bus 109 and saved in the RAM 107 or the unillustrated hard disk. The transmission medium 33 is not limited to a wired transmission medium and may be a wireless transmission medium.

An exclusive processing section detector 110 detects the start and the end of a section during which an exclusive processing is executed. This is described in more detail later with reference to FIG. 2.

The clock control judging device 111 receives a notification of the start or end of the exclusive processing section from the exclusive processing section detector 110 and gives a command to control the clock frequency to the clock controller 102 in accordance with the received notification. This is also described in more detail later similar to the exclusive processing section detector 110.

The software stored in the storage 104 is loaded into the computing device 103 via the bus 109 and implemented. For example, when the information processing apparatus implements the software, the software saved in the RAM 107 is executed by the CPU 105 after being loaded into the CPU 105. At this time, data necessary for the implementation of the software are read upon occasion, for example, from the RAM 107 of the storage 104, and sent to the CPU 105 of the computing device 103 via the bus 109.

In the case that the software is implemented after being loaded into the DSP 106 or an other processor instead of being loaded into the CPU 105 or in the case that the software is saved in the ROM 108 or an other storage medium instead of being saved in the RAM 107, the information processing apparatus of the present invention can similarly operate.

The software has exclusive processing sections during which an exclusive processing is executed without receiving any other request because it takes up the CPU 105 for the execution or executes a processing using a specific resource. This exclusive processing section is section during which no other processing is received in order to execute its own processing with a higher priority. The exclusive processing sections include interrupt prohibiting sections during which an interrupt processing required, for example, by a device or software, is prohibited, preempt prohibiting sections during which an execution right of the CPU is not conceded to other execution units, and sections during which an access to the same resource from an other execution unit or an other CPU is prohibited using a locking mechanism.

Here, the execution unit is a unit by which an original executed state is held. Examples of the execution unit include a process, a task and a thread. A processing part of a basic software (processing part of a kernel space) itself is also considered as one execution unit. In the processing part of the basic software, processings for requesting interrupts are sometimes executed depending on the respective interrupts. Such processings may be considered as separate execution units. In an information processing apparatus provided with multiple processors, processings executed in the respective processors have separate execution units.

Even if a request of another processing is made during the above exclusive processing section, the requested processing is not received until the exclusive processing section ends, wherefore there is a possibility of considerably delaying this execution. On the other hand, if a requested processing has a specified restriction in time up to the execution, i.e., if a processing requesting a real-time operability is requested during the exclusive processing section, there is the danger of largely impairing the real-time operability. Accordingly, the exclusive processing section has to be as short as possible in order to ensure the real-time operability.

The information processing apparatus according to one embodiment of the present invention has two modes for controlling the clock in the clock controller 102. One mode is a high-speed processing mode in which the processing is completed at a high speed in the exclusive processing section, and the other mode is a low power-consuming mode in which the processing is executed in a normal processing section during which the processing is not exclusively executed while suppressing the power consumption. The processing can be executed at a high speed by increasing the clock frequency in the high-speed processing mode, whereas the processing is executed at a low speed to reduce the power consumption by decreasing the clock frequency in the low power-consuming mode.

Figure 2:
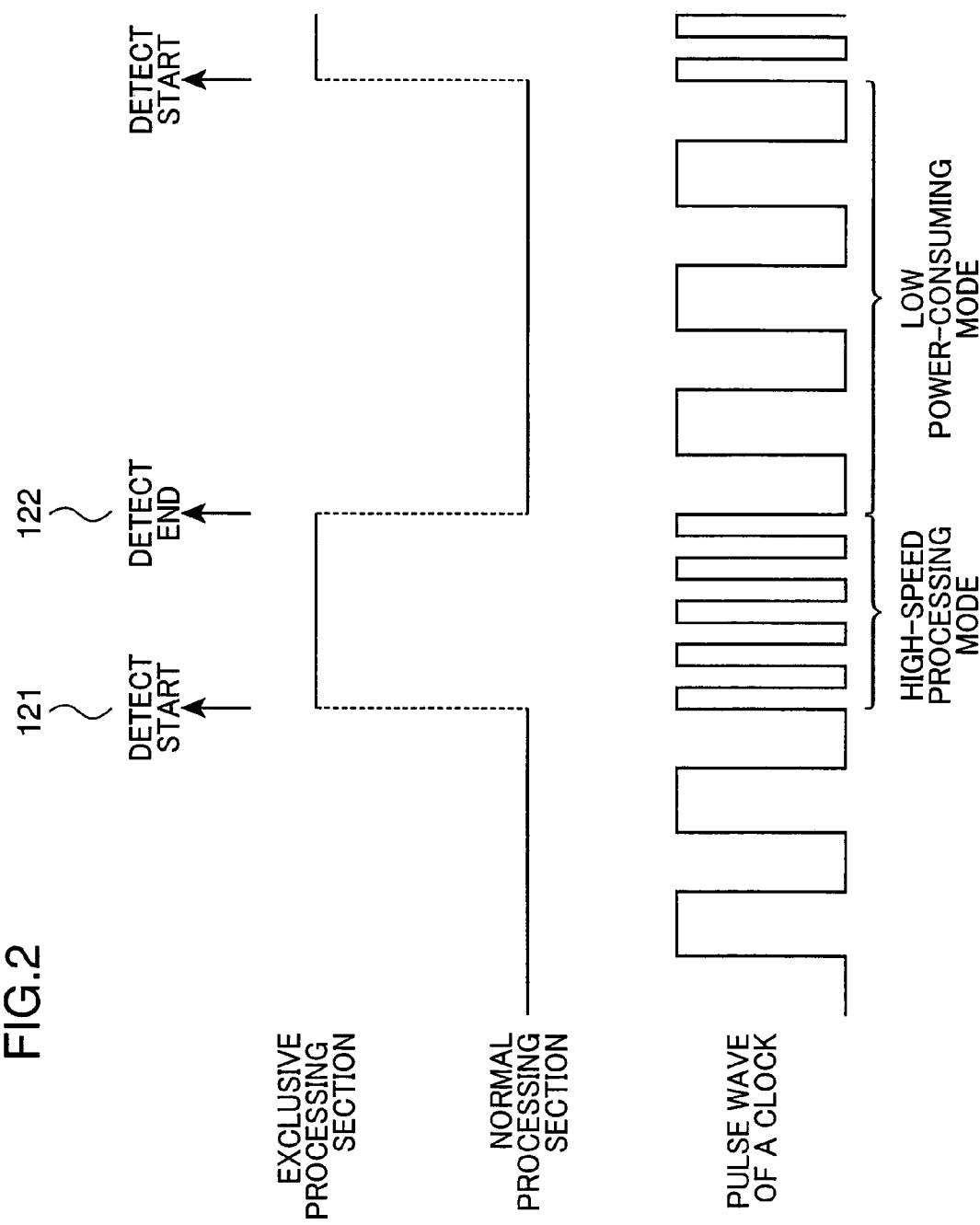
FIG. 2 is a chart showing a relationship between processing sections and a clock frequency.

FIG. 2 shows a change of a pulse wave of a clock in exclusive processing sections and a state of controlling the clock frequency.

The exclusive processing section detector 110 detects the exclusive processing section. Reference numeral 121 in FIG. 2 shows that the exclusive processing section detector 110 detects the start of the exclusive processing upon entering the exclusive processing section from a normal processing section during which the processing is not exclusively executed. Further, reference numeral 122 in FIG. 2 shows that the exclusive processing section detector 110 detects the end of the exclusive processing upon returning to the normal processing section from the exclusive processing section. The start and end of the exclusive processing section are clearly shown, and the exclusive processing section detector 110 can automatically detect them.

The clock control judging device 111 receives the notification of the start or end of the exclusive processing section from the exclusive processing section detector 110. The clock control judging device 111 outputs a command to increase the clock frequency to the clock controller 102 upon receiving the notification of the start of the exclusive processing section while outputs a command to decrease the clock frequency upon receiving the notification of the end of the exclusive processing section. Thus, as shown in FIG. 2, the processing is executed in the high-speed processing mode during the exclusive processing sections while being executed in the low power-consuming mode during the normal processing sections.

The exclusive processing section detector 110 and the clock control judging device 111 can be realized, for example, by software. If the starting or ending timing of the exclusive processing section is clearly described in the software, the exclusive processing section detector 110 can be realized by embedding a part for giving notification to the clock control judging device 111 in a start processing or an end processing. Further, the clock control judging device 111 can be realized by including the command given to the clock controller 102 to increase the clock frequency in the embedded processing in the case of starting the exclusive processing section while including the command given to the clock controller 102 to decrease the clock frequency in the embedded processing in the case of ending the exclusive processing section.

As another method for realizing the exclusive processing section detector 110 and the clock control judging device 111 by the software, an interface for the clock control may be prepared and inserted before and after the start or end of the exclusive processing section in the software. In other words, a software developer inserts the processing of increasing the clock frequency in accordance with the start of the exclusive processing section or decreasing the clock frequency in accordance with the end thereof, whereby the exclusive processing section detector 110 and the clock control judging device 111 can be realized.

Figure 3:
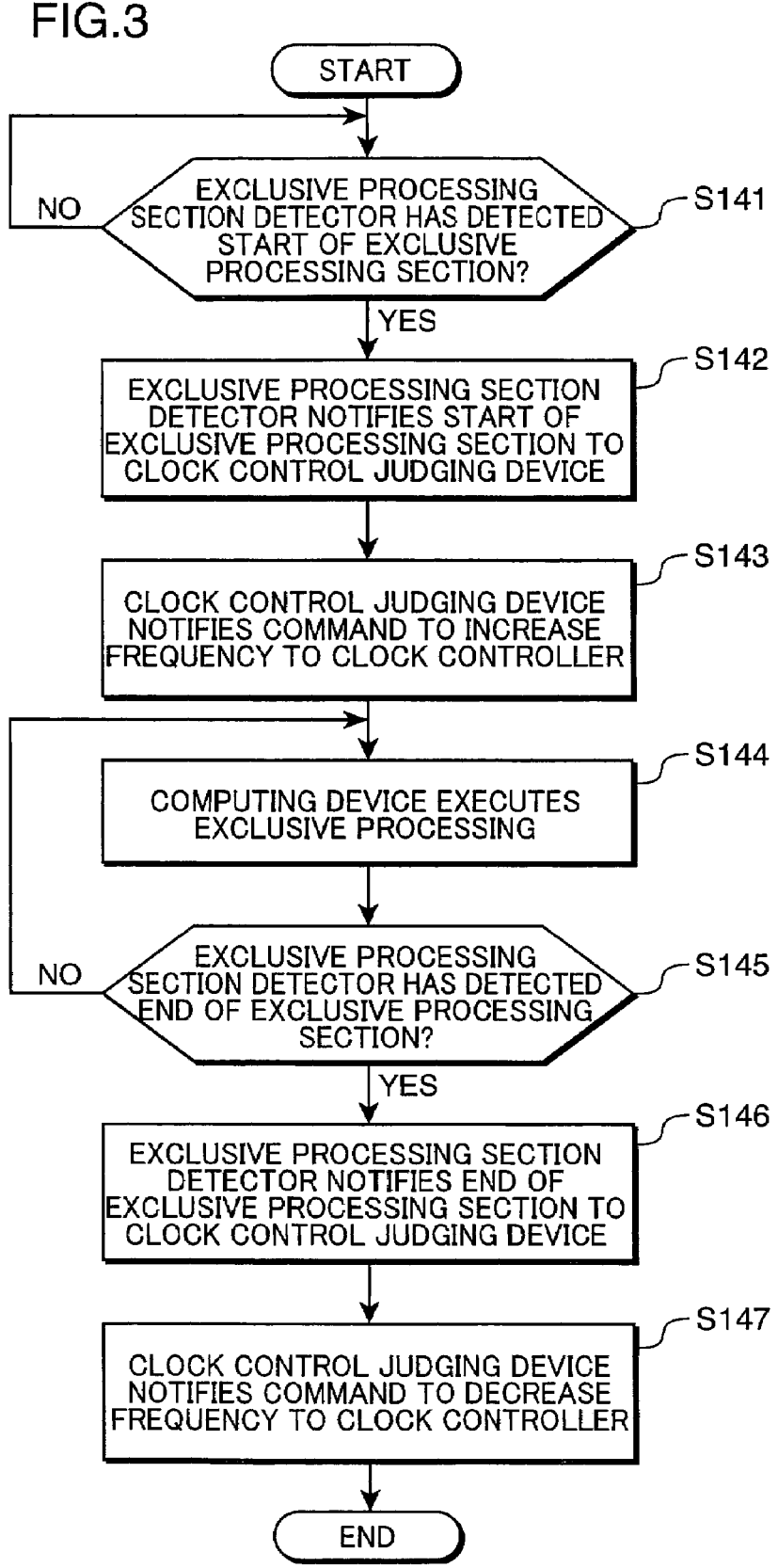
FIG. 3 is a flowchart showing a procedure of a clock control.

FIG. 3 shows a procedure in which the exclusive processing section detector 110 detects the exclusive processing section and the clock control judging device 111 outputs the commands to control the clock to the clock controller 102.

First, the exclusive processing section detector 110 judges whether or not the start of the exclusive processing section is detected (Step S141). If the exclusive processing section detector 110 has not detected the start of the exclusive processing section (NO in Step S141), the judgment of Step S141 is repeated. On the other hand, if the exclusive processing section detector 110 has detected the start of the exclusive processing section (YES in Step S141), it notifies the start of the exclusive processing section to the clock control judging device 111 (Step S142).

Upon receiving the notification, the clock control judging device 111 outputs the command to increase the clock frequency to the clock controller 102 (Step S143). Thus, the mode of the information processing apparatus is switched to the high-speed processing mode.

Thereafter, the computing device 103 executes the exclusive processing (Step S144), and the exclusive processing section detector 110 judges whether or not the end of the exclusive processing section in detected (Step S145). If the exclusive processing section detector 110 has not detected the end of the exclusive processing section (NO in Step 145), this routine returns to Step S144 to continue to execute the exclusive processing. On the other hand, if the exclusive processing section detector 110 has detected the end of the exclusive processing section (YES in Step S145), it notifies the end of the exclusive processing section to the clock control judging device 111 (Step S146).

Upon receiving the notification, the clock control judging device 111 outputs the command to decrease the clock frequency to the clock controller 102 (Step S147). Thus, the mode of the information processing apparatus is switched to the low power-consuming mode.

In this way, the information processing apparatus of the present invention can execute the processing in the high-speed processing mode during the exclusive processing section.

Figure 4:
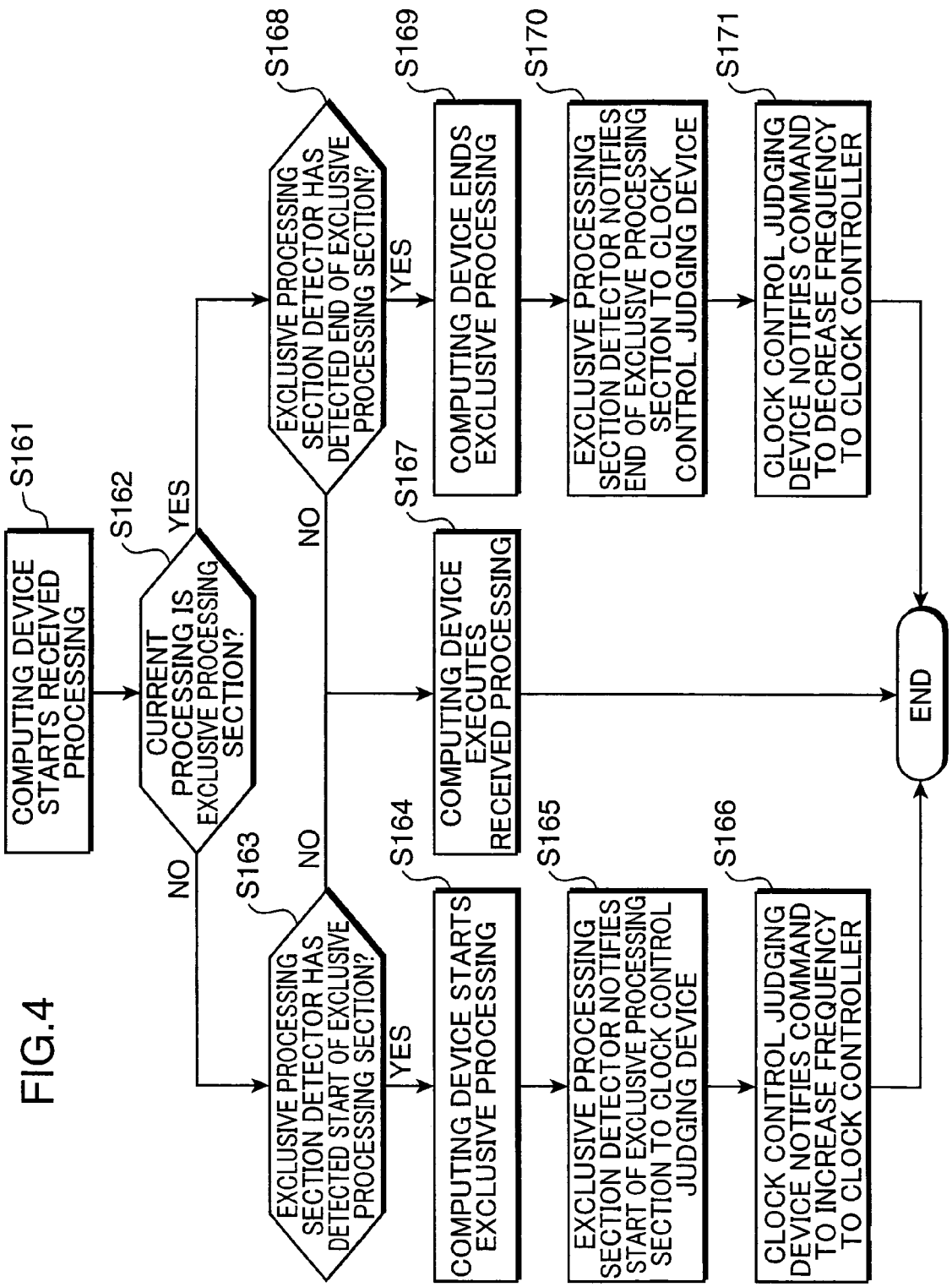
FIG. 4 is a flowchart showing a procedure of a clock control.

FIG. 4 shows another procedure in which the exclusive processing section detector 110 detects the exclusive processing section and the clock control judging device 111 outputs the commands to control the clock to the clock controller 102.

First, the computing device 103 starts a certain specific processing (Step S161). Subsequently, the exclusive processing section detector 110 judges whether a present processing section is an exclusive processing section (Step S162). This routine proceeds to Step S163 if the present processing section is not an exclusive processing section in the case of a normal executing process (NO in Step S162), while proceeding to Step S168 in the case of the exclusive processing section (YES in Step S162).

The exclusive processing section detector 110 judges whether or not the exclusive processing section is detected from the processing being executed (Step S163). If the exclusive processing section detector 110 has detected the start of the exclusive processing section (YES in Step S163), the computing device 103 starts the exclusive processing section (Step S164). Otherwise, (NO in Step S163), the computing device 103 executes the ongoing processing in accordance with a content thereof.

After the start of the exclusive processing section in Step S164, the exclusive processing section detector 110 notifies the start of the exclusive processing section to the clock control judging device 111 (Step S165). Upon receiving this notification, the clock control judging device 111 outputs the command to increase the clock frequency to the clock controller 102 (Step S166). In this way, the mode of the information processing apparatus is switched to the high-speed processing mode.

The clock controller 102 increases the clock frequency upon receiving the command from the clock control judging device 111. For example, if the clock frequency in the high-speed processing mode is determined to be 50 MHz beforehand, the clock controller 102 increases the clock frequency up to 50 MHz. As another method, the frequency-dividing ratio of the clock controller 102 may be set at 1 so that the clock generated in the clock generator 101 is supplied to the computing device 103 and the storage 104 without having its frequency divided. Alternatively, upper limit values of the clock frequency permitted by the respective devices such as the computing device 103 and the storage 104 may be set, and the clock controller 102 may control the clock in such a manner as to output the clock at a maximum clock frequency within a range satisfying the upper limit value set for each device.

On the other hand, the exclusive processing section detector 110 judges whether or not the end of the exclusive processing section is detected (Step S168). The exclusive processing section is ended (Step S169) in the case of the processing for exiting from the exclusive processing (YES in Step S168), whereas the computing device 103 executes the ongoing processing in accordance with a content thereof (Step S167) otherwise (NO in Step S168).

After the exclusive processing section is ended in Step S169, the exclusive processing section detector 110 notifies the end of the exclusive processing section to the clock control judging device 111 (Step S170). Upon receiving this notification, the clock control judging device 111 outputs the command to decrease the clock frequency to the clock controller 102 (Step S171). In this way, the mode of the information processing apparatus is switched to the low power-consuming mode.

The clock controller 102 decreases the clock frequency upon receiving the command from the clock control judging device 111. For example, if the clock frequency in the low power-consuming mode is determined to be 5 MHz beforehand, the clock controller 102 increases the clock frequency up to 5 MHz. Alternatively, lower limit values other clock frequency permitted by the respective devices such as the computing device 103 and the storage 104 may be set, and the clock controller 102 may control the clock in such a manner as to output the clock at a minimum clock frequency within a range satisfying the lower limit value set for each device.

According to another method for decreasing the clock frequency when the clock controller 102 receives the commands from the clock control judging device 111, the clock frequency in the low power-consuming mode may be determined in view of a load state of the information processing apparatus, a temperature state increased by heat generation or a remainder amount of a battery supplying power.

According to still another method, the clock frequency at which the apparatus has been operated may be saved before the clock frequency is increased in Step S166 upon entering the exclusive processing section, and the clock frequency may be returned to the saved frequency upon exiting from the exclusive processing section.

As described above, the execution time of the exclusive processing section is shortened by causing the information processing apparatus to operate at a maximum clock frequency within a permissible range, whereby the real-time operability can be improved. In the normal processing section during which the proceeding is not exclusively executed, the clock frequency is reduced to the minimum level within the permissible range of the information processing apparatus to suppress the power consumption. Therefore, the real-time operability can be improved by maximally suppressing the power consumption.

Second Embodiment

Further, in an information processing apparatus according to a second embodiment of the present invention, the suppression of the power consumption is made possible by decreasing a voltage supplied from a power source as the clock frequency is decreased. The voltage supplied to the information processing apparatus has its standard minimal required depending on the clock frequency determined by hardware. Generally, the minimally required voltage decreases as the clock frequency is decreased. Thus, the voltage can be reduced from a level where the clock frequency is high. Further, since the consumed power changes in proportion to the square of the voltage, it is largely influenced by the voltage.

Figure 5:
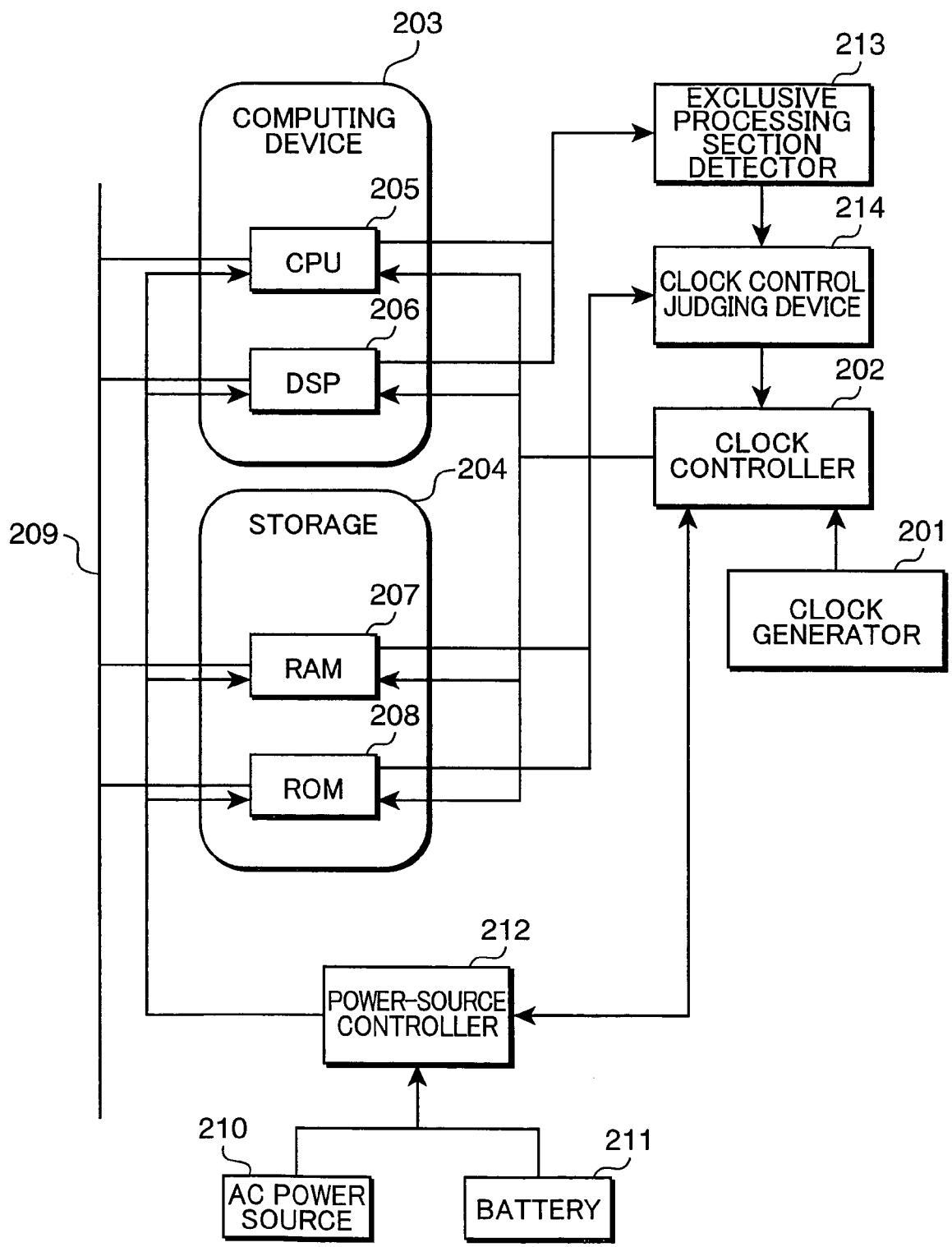
FIG. 5 is a block diagram showing a construction of an information processing apparatus according to a second embodiment of the invention.

FIG. 5 shows an information processing apparatus for suppressing power consumption by decreasing a voltage supplied from a power source as a clock frequency is decreased. In FIG. 5, an AC power source 210, a battery 211 and a power-source controller 212 are added to the information processing apparatus of FIG. 1. A clock generator 201, a clock controller 202, a computing device 203, a storage 204, a CPU 205, a DSP 206, a RAM 207, a ROM 208, a bus 209, an exclusive processing section detector 218 and a clock control judging device 214 have the same functions as those of the first embodiment.

The AC power source 210 and the battery 211 are power source supplying devices of the information processing apparatus. A voltage may be supplied from the AC power source 210 or from the battery 211.

The power-source controller 212 selects the power source supplying device from the AC power source 210 and the battery 211 and, at the same time, controls the voltage to be supplied to the information processing apparatus.

Similar to the first embodiment, the second embodiment operates in accordance with the procedure of the flowchart shown in FIG. 4, but new operations are further added to Steps S166 and S171 of FIG. 4.

Figure 6:
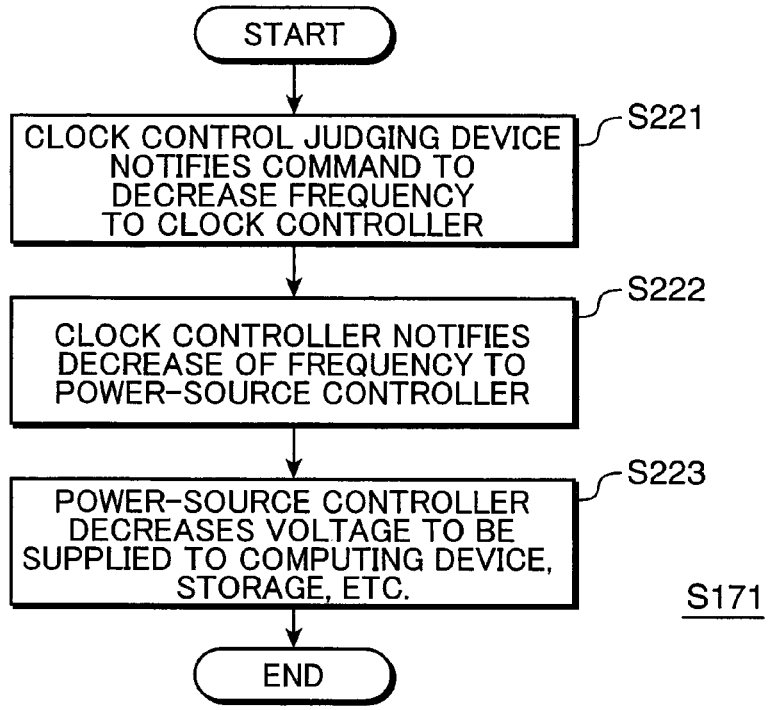
FIG. 6 is a flowchart showing a procedure of a voltage control when the clock frequency is decreased.

In the second embodiment, Step S171 of FIG. 4 is executed in accordance with a procedure shown in FIG. 6. With reference t FIG. 6, a processing executed upon outputting a command to decrease the clock frequency in the second embodiment is described. The clock control judging device 214 outputs the command to decrease the clock frequency to the clock controller 202 (Step S221). Upon receiving this notification, the clock controller 202 gives a notification of having decreased the clock frequency to the power-source controller 212 after decreasing the clock frequency (Step S222). The power-source controller 212 decreases the voltage to be supplied to the computing device 203 including the CPU 205 and DSP 206 and to the storage 204 including the RAM 207 and the ROM 208 when the clock frequency is decreased (Step S223).

The voltage can be decreased up to a level where the respective elements of the information processing apparatus such as the clock controller 202, the computing device 203 and the storage 204 are still operable. For example, the voltage can be decreased up to a maximum value of minimum operable voltages of the respective elements in order to guarantee that all the elements are operable. Specifically, if the minimum operable voltages of elements A, B and C are 5 V, 7 V and 15 V, respectively, the voltage can be decreased up to 15 V which is the maximum value of the minimum operable voltages of these three elements.

Figure 7:
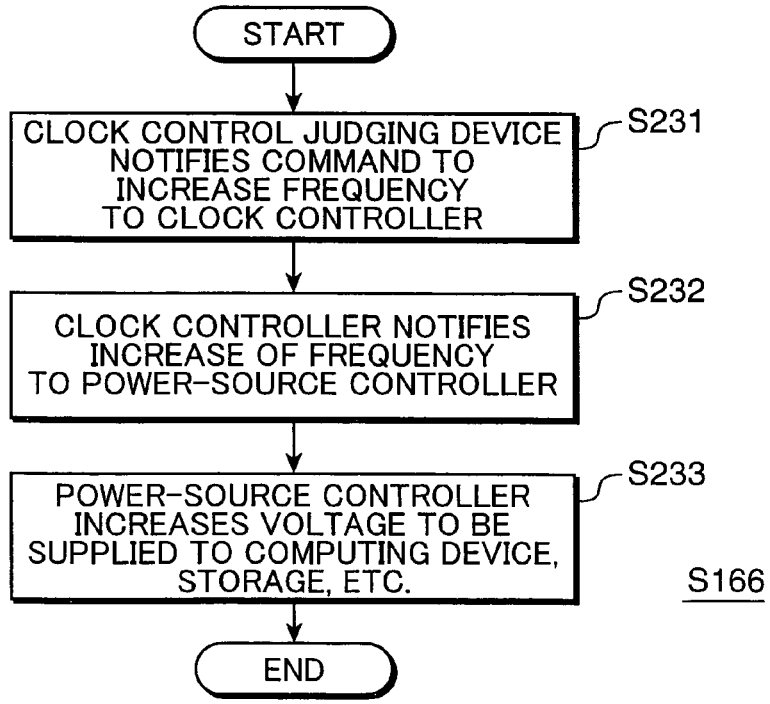
FIG. 7 is a flowchart showing a procedure of a voltage control when the clock frequency is increased.

In the second embodiment, Step S166 of FIG. 4 is executed in accordance with a procedure shown in FIG. 7. With reference to FIG. 7, a processing executed upon outputting a command to increase the clock frequency in the second embodiment is described. The clock control judging device 214 outputs the command to increase the clock frequency to the clock controller 202 (Step S231). Upon receiving this notification, the clock controller 202 gives a notification of having increased the clock frequency to the power-source controller 212 after increasing the clock frequency (Step S232). The power-source controller 212 increases the voltage to be supplied to the computing device 203 including the CPU 205 and DSP 206 and to the storage 204 including the RAM 207 and the ROM 208 when the clock frequency is increased (Step S233).

The voltage can be increased up to a level where the respective elements of the information processing apparatus such as the clock controller 202, the computing device 203 and the storage 204 are still operable. For example, the voltage can be increased up to a minimum value of maximum operable voltages of the respective elements in order to guarantee that all the elements are operable.

As described above, the power consumption can be further suppressed by not only decreasing the clock frequency, but also changing the voltage by means of the power-source controller 212.

However, as shown in FIG. 8, time is required to stabilize the voltage after the voltage increase. In the case of increasing the clock frequency by increasing the voltage from level 251 to level 252, the power-source controller 212 gives a notification to the clock controller 202 when the increased voltage is stabilized, and the clock controller 202 then increases the clock frequency. Normally, a state where the voltage exceeds the targeted level 252 continues immediately before the increased voltage is stabilized. In such a case, if it is guaranteed that the voltage does not fall below the level 252 of FIG. 8, the power-source controller 212 may notify the clock controller 202 to increase the clock frequency at a point of time 253 when the voltage reaches the level 252.

If the clock frequency is not changed until the voltage reaches the level 252 in the information processing apparatus which operates while the voltage is increased, the real-time operability is impaired at the beginning of the exclusive processing section. Accordingly, the clock controller 202 can increase the clock frequency in a stepwise manner while the voltage is increased from the level 251 to the level 252 of FIG. 8. In such a case, the clock controller 202 has correspondence information between the value of the voltage and the realizable clock frequency under the presence of this voltage, and sets the clock frequency in accordance with a change in the value of the voltage supplied from the power-source controller 212.

As a method for increasing the clock frequency in a stepwise manner during the increase of the voltage, the storage 204 may possess the correspondence information between the value of the voltage and the realizable clock frequency under the presence of the voltage. In such a case, the computing device 203 obtains the clock frequency realizable at the present voltage supplied from the power-source controller 212 in accordance with the correspondence information loaded from the storage 204. Subsequently, the computing device 203 gives a command to increase the clock frequency up to the obtained value to the clock controller 202.

The correspondence information between the voltage value and the clock frequency is information on the level of the voltage minimally required for the respective elements including the CPU 205 and the DSP 206 of the computing device 203 and the RAM 207 and the ROM 208 of the storage 204 to operate at a specific clock frequency. For example, the correspondence information may be a correspondence table describing the level of the necessary voltage in correspondence with the clock frequencies divided into several steps or a function for outputting the level of the necessary voltage using the clock frequency as an input for each of the elements.

If one clock controller 202 supplies a clock to one element in the information processing apparatus, the clock frequency may be increased in accordance with the correspondence table or the function of the clock frequency and the voltage. If one clock controller 202 supplies clocks to a plurality of elements at the same clock frequency, the maximum value of the highest voltages required by the respective elements may be set as a threshold value and the clock frequency may be increased when the voltage exceeds this threshold value.

The clock controller 202 constantly detects the level of the voltage from the power-source controller 212, and controls the clock frequency to the one in conformity with the detected level of the voltage by referring to the correspondence information of the voltage and the clock frequency. By such a control, the clock frequency can be increased in accordance with the voltage even while the voltage is increased upon entering the exclusive processing section, with the result that the real-time operability can be improved.

Further, time is required to stabilize the voltage after the voltage decrease. In the case of decreasing the clock frequency by decreasing the voltage from the level 252 to the level 251, the power-source controller 212 notifies the clock controller 202 to decrease the clock frequency at a point of time 254 before the voltage is decreased. Normally, a state where the voltage falls below the targeted level 251 continues immediately before the decreased voltage is stabilized. If a minimum voltage is guaranteed until the voltage reaches the level 251, the clock controller 202 controls the clock frequency to the one realizable even at the minimum voltage also when the voltage is unstable. After the voltage is stabilized, the power-source controller 212 may notify the clock controller 202 to control the clock frequency again to the one corresponding to the voltage at that time.

Further, if the voltage has to be decreased again at the end of the exclusive processing section until the voltage is completely increased as shown by 256 in FIG. 8, it is not necessary for the power-source controller 212 to change the voltage and for the clock controller 202 to change the clock frequency as the voltage is changed. Accordingly, the clock control judging device 214 may not output the command to increase the clock frequency to the clock controller 202 if the exclusive processing section is to end soon. However, in order to maintain the real-time operability in the exclusive processing section, the clock control judging device 214 may output the command to increase the clock frequency to the clock controller 202 even if the exclusive processing section is to end soon.

In order to enable the clock control judging device 214 to judge whether or not the exclusive processing section is to end soon, information on the execution time of the corresponding exclusive processing section is saved in the storage 204, for example, as shown in FIG. 9. The clock control judging device 214 obtains this information from the storage 204 and uses it. If there is a point of time where a certain exclusive processing section starts, there is always a point of time which corresponds to this starting point and where this exclusive processing section ends. A section between the starting point and the ending point is the exclusive processing section.

A plurality of exclusive processing sections are given in a left column 301 of FIG. 9. Interrupt prohibiting sections and preempt prohibiting sections, which are exclusive processing sections, are set at a plurality of positions during the processing executed by the computing device 203. Accordingly, it is necessary to specify the position of the exclusive processing section in the processing in order to possess the information on the execution times of the respective exclusive processing sections.

One of the methods for specifying the exclusive processing section is by software. According to this method, such a configuration as to notify the start and the end of which exclusive processing section is incorporated into the program. For example, the exclusive processing sections detectable by the exclusive processing section detector 213 are extracted beforehand and a list of numerical values or like identification symbols for specifying the respective exclusive processing sections is prepared. Upon executing the exclusive processing section, the software notifies the corresponding identification symbol, e.g., "section start #1", in the list to the storage 204. In this way, which exclusive processing section is being executed can be clearly indicated.

More specifically, identification names for distinguishing the respective exclusive processing section in one-to-one correspondence may be, for example, generated beforehand upon preparing a program, and codes for notifying the identification name of the exclusive processing section immediately before (or immediately after) the start (or the end) of the exclusive processing section during the execution of the program may be incorporated into the program. At this time, the contents of the left column 301 of FIG. 9, i.e., the identification names of all (or a part) of the designated exclusive processing sections, are saved in the storage 204. Only the identification names of a part of the designated exclusive processing sections are saved in order to clock-control only a part of the exclusive processing sections as described later.

As another example, after an already prepared program is statically analyzed beforehand as a pre-processing, the start and the end of exclusive processing sections may be extracted and identification names may be given to the extracted exclusive processing sections and saved in the storage 204 as the contents of the left column 301 of FIG. 9. In such a case, codes for notifying the start and end of the exclusive processing sections during the execution of the program are inserted into the program during this pre-processing.

Here, the pre-processing means a processing carried out before the execution of the program. The pre-processing can be carried out, for example, by executing a specific program immediately after the computing device 203 starts operating after the information processing apparatus is turned on. Alternatively, a CPU separate from the CPU 205 may be incorporated into the computing device 203, and the pre-processing may be carried out by this separate CPU executing a specific program. The pre-processing can also be carried out by analyzing an already prepared program manually or using a tool before this program is loaded into the storage 204. Further, the term "static" is a concept opposite from the term "dynamic" which means that the program is being executed. Accordingly, "static analysis" does not mean to analyze the program at the same time the program is being executed, but means to analyze the program that is not being executed, i.e., the program in pause or the program before use.

Even if the program is statically analyzed, the processing of saving the contents of the left column 301 of FIG. 9 in the storage 204 can be dynamically carried out. For example, when the exclusive processing section is executed during the execution of the program, the code for saving the identification name of this section in the storage 204 may be inserted into the program in the process of statically analyzing the program.

According to another method for specifying the exclusive processing sections, they may be specified in one-to-one correspondence in accordance with internal information of the computing device 203 at the time of executing an exclusive processing. The internal information of the computing device 203 is, for example, a value of a register used for the internal processing. The computing device 203 notifies the storage 204 of the internal information thereof for specifying the exclusive processing section upon executing the exclusive processing section.

More specifically, this method is designed to identify the exclusive processing section in accordance with the state of the hardware or the CPU 205 instead of notifying the exclusive processing section by the program. For example, contents of a plurality of registers can be used as the internal information of the CPU 205. It is possible to specify the exclusive processing section by obtaining the value of a specific register. For example, a value of a program counter among the registers designates an execution address of the program. Thus, this can be used to identify the exclusive processing section. In such a case, codes for notifying the value of the program counter may be incorporated into the program beforehand.

As another example, based on a value of a stack pointer among the registers, stacked information, i.e., information saved in a part of a memory area of the storage 204 allotted for stacking, can be searched. A function calling relationship can be grasped from this information. The exclusive processing section can be dynamically detected in accordance with the grasped function-calling relationship. Here, the "function" is, for example, a function mentioned in C language and means a subroutine or something analogous thereto, i.e., a processing unit which can be referred to a main processing unit.

The information on the execution times of the exclusive processing sections shown in FIG. 9 can be administered by the storage 204 by the various methods described above. Similar methods can be adopter not only for the left column 301 of FIG. 9, but also for a left column 401 of FIG. 12 to be described later.

Pieces of information at 302, 303, 304 in FIG. 9 are pieces of time information obtained thus far by executing the respective exclusive processing sections shown at 301. More specifically, times required for the last executions are shown at 302. Total times required to execute the respective exclusive processing sections and the total numbers of times of the execution are shown at 303. Average execution times of the respective exclusive processing sections calculated based on the total execution times and the total number of times of execution obtained at 303 are shown at 304.

Figure 10:
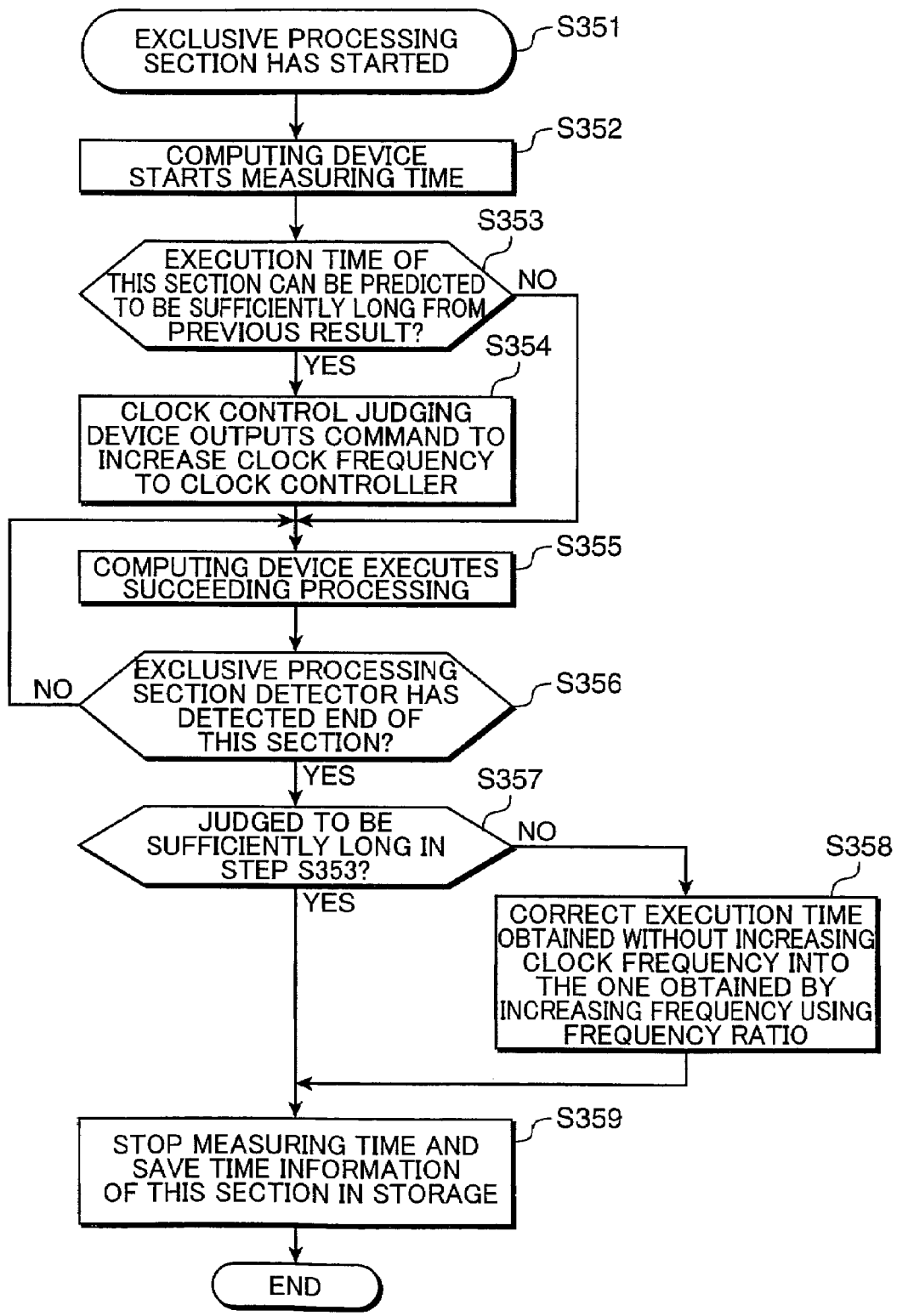
FIG. 10 is a flowchart showing a procedure of a processing in accordance with execution time information at the start of the exclusive processing section.

A procedure of processing based on the information on the execution time of a certain exclusive processing section when this exclusive processing section is started is shown in a flowchart of FIG. 10. When the exclusive processing section is started (Step S351), the computing device 203 starts counting time in order to grasp the execution time of this exclusive processing section (Step S352). Subsequently, the exclusive processing section detector 213 judges whether or not the execution time of the exclusive processing section being currently executed is sufficiently long (Step S353). For this judgment, a threshold value may be set for the execution time, and a judgment may be made by comparing this threshold value with a predicted execution time of the exclusive processing section being currently executed.

The threshold value is set in view of a time required to increase the voltage. Further, the execution time is predicted based on the information on the execution time of the exclusive processing section shown in FIG. 9. The average execution time of the exclusive processings shown at 304 may be used or the last execution time shown at 302 may be used. For example, in the case that the threshold value is 10 μsec. and the average execution time at 304 is used as the predicted execution time, if an interrupt prohibiting section of identification number 1 is started as an exclusive processing as shown in FIG. 9, the execution time of this section is judged to be sufficiently long since the average execution time of 98.99 μsec. as the predicted execution time is longer than the threshold value. Conversely, if an interrupt prohibiting section of identification number 2 is started, the execution time of this section is judged not to be sufficiently long since the average execution time of 0.72 μsec. is shorter than the threshold value.

If the exclusive processing section detector 213 judges that the exclusive processing section being executed is sufficiently long (YES in Step S353), the computing device 203 commands the clock controller 202 to increase the clock frequency (Step S354) and continues the succeeding processing (Step S355). On the other hand, if the exclusive processing section detector 213 judges that the exclusive processing section being executed is not sufficiently long (NO in Step S353), the computing device 203 continues the succeeding processing without increasing the clock frequency (Step S355).

When the exclusive processing section detector 213 detects the ending point of the exclusive processing section being executed (Step S356), the computing device 203 judges whether the clock frequency has been increased in this processing section upon judging that the previous execution time was sufficiently long in Step S353. Unless the clock frequency has been increased (NO in Step S357), the execution time of this processing section is extended since the clock frequency is not increased. Thus, a ratio of the clock frequency originally intended to be increased to the actual clock frequency is taken, and the execution time is corrected to the one obtained when the clock frequency is increased (Step S358). For example, if this processing section is executed at a low clock frequency of 4 MHz although it was set to increase the clock frequency to 40 MHz, the clock frequency ratio is 10 and the execution time is corrected by being multiplied by ¹⁄₁₀. Thereafter, the computing device 203 completes the measurement of the time of this processing section and saves information on the time required for the execution (Step S359). For example, the information on the last execution time at 302, the total execution time and the total numbers of the execution at 303, and the average execution time at 304 as shown in FIG. 9 may be renewed.

It is desirable to select a predicted execution time obtained upon the assumption that the processing is executed while keeping the clock frequency low as a predicted execution time to be compared with the threshold value. Further, a time required for the power-source controller 212 to increase the voltage, i.e., a voltage-increasing time, may be set as the threshold value. Furthermore, a time obtained by adding a certain margin to the voltage-increasing time may be set as the threshold value. Further, a sum of the voltage-increasing time and a time required for the power-source controller 212 to decrease the voltage, i.e., a voltage-decreasing time, may be set as the threshold value. Furthermore, a time obtained by adding a certain margin to the above sum may be set as the threshold value. Further, an added time obtained by adding a predicted execution time at the time of increasing the clock frequency to the above sum may be set as the threshold value. Furthermore, a time obtained by adding a certain margin to this added time may be set as the threshold value. An increase in the clock frequency can be avoided with corresponding degrees of certainty if such an increase brings about a negative effect or a little effect in consideration of ensuring the real-time operability.

The reflection of the voltage-increasing time and the voltage-decreasing time on the threshold value takes into account that it takes time until the voltage is changed after the power-source controller 212 receives an instruction. The procedure of FIG. 10 described above premises that the execution of the program is in pause during the time required to change the voltage. In other words, the predicted execution time at the time of increasing the clock frequency in FIG. 8 corresponds to a period during which the voltage is constant at the high value 252.

Instead of the voltage-increasing time to be reflected on the threshold value, a frequency-increasing time, which is a time required for the clock controller 202 to increase the clock frequency, can be used. Similarly, instead of the voltage-decreasing time to be reflected on the threshold value, a frequency-decreasing time, which is a time required for the clock controller 202 to decrease the clock frequency, can be used. The reflection of the frequency-increasing time and the frequency-decreasing time on the threshold value takes into account that it takes time until the clock frequency is changed after the clock controller 202 receives an instruction. The procedure of FIG. 10 described above premises that the execution of the program is in pause during the time required to change the clock frequency.

FIG. 11 is a graph showing a state of a change in the clock frequency when it takes time to change the clock frequency. In FIG. 11, a certain time is required for the clock frequency to increase from a low vale 501 to a high value 502. Likewise, a certain time is required for the clock frequency to decrease from the high value 502 to the low value 501. A predicted execution time at the time of increasing the clock frequency in FIG. 11 corresponds to a period during which the clock frequency is constant at the high value 502, i.e., a period between time 503 and time 504.

The procedure of the exclusive processing section is shown with reference to FIG. 10. In the case that a plurality of combinations of the voltages and the corresponding clock frequencies can be taken, such voltage and clock frequency as to make the exclusive processing section shortest can be selected in the operations of Steps S353 and S354.

A method for selecting the optimal voltage and clock frequency in Steps S353 and 354 is described below. First, the time required for the voltage to increase from the level 251 to the level 252 shown in FIG. 8 and stabilize is determined by the current voltage level and the voltage level after the change, a voltage increasing speed, i.e., the inclination of a voltage-to-time curve. Further, the predicted execution time of the exclusive processing section is determined by a predicted execution time based on a certain clock frequency and the clock frequency after the change. The clock frequency after the change is determined by the voltage level after the change since being a maximum clock frequency corresponding to the voltage level after the change. As a result, such a voltage level as to minimize the predicted execution time of the exclusive processing section may be selected on a condition that the predicted execution time of the exclusive processing section is longer than the voltage-increasing time. The maximum clock frequency corresponding to this voltage level is an optimal clock frequency.

More specifically, the above procedure premises that the program cannot be executed while the voltage is being increased or decreased. In other words, the above procedure premises that the program is executed only in the periods during which the voltage level is flat in FIG. 8 or 11. On this premise, the above procedure is designed to increase the clock frequency to the one corresponding to the optimal voltage in view of a relationship between the voltage-increasing speed and voltage decreasing speed, i.e., the voltage-increasing time and voltage-decreasing time, and the time required to execute the exclusive processing section at the increased clock frequency other than simply changing the voltage and the clock frequency between two values corresponding to the "high-speed processing mode" and the "low power-consuming mode".

A specific example is given below. It is assumed that the execution time of a certain exclusive processing section is predicted to be 60 sec. when the computing device 203 is operating at a clock frequency of 20 MHz in the "low power-consuming model", which is a normal operation. In such a case, if the clock frequency is increased to 60 MHz, the execution time of the exclusive processing section is expected to be 20 sec. by a simple calculation. However, if it is assumed that a period of 5 sec. is required to increase the voltage in order to increase the clock frequency by 10 MHz, a total period of 40 sec. is required to increase the clock frequency from 20 MHz to 60 MHz and then decrease it. In other words, a period of 60 sec. (20+40=60) is required for the voltage to return to the previous low value, including the execution time of exclusive processing section of 20 sec.

On the other hand, a total period of 20 sec. is sufficient to increase the clock frequency from 20 MHz to 40 MHz and then decrease it in the case of increasing the clock frequency not to 60 MHz, but to 40 MHz. If the clock frequency is 40 MHz, the processing speed is doubled as compared to the case where the clock frequency is 20 MHz. Thus, the execution time of the exclusive processing section is 30 sec. In other words, a period of 50 sec. (30+20=50) is required for the voltage to return to the previous low value, including the execution time of exclusive processing section of 20 sec.

In this way, the optimal clock frequency to be increased can be selected within a predetermined range. Specifically, if an effective frequency, which is a clock frequency at which the predicted time in the case of executing the exclusive processing section while keeping the clock frequency low is longer than the time required for the voltage to return to the low value or a time obtained by adding a certain margin to the former time, lies within the predetermined range, the clock frequency may be increased to the effective frequency. Unless the effective frequency lies within a predetermined range, the clock frequency may not be increased. The predetermined range may be a discontinuous range for enabling the clock frequency to be changed in a stepwise manner or a continuous range. If a predicted value of the execution time of the exclusive processing section is obtained for one clock frequency, the execution time of the exclusive processing section and the time required to increase and decrease the voltage can be obtained for another arbitrary clock frequency by simple calculations.

In the case of selecting such voltage and clock frequency as to minimize the exclusive processing section in this way, the execution time measured in accordance with the selected clock frequency needs to be corrected into the operations of Steps S357 and S358. The time information saved in Step S359 is time information measured based on a certain specific clock frequency. For example, in the case that the execution time of the exclusive processing section is measured based on a maximum clock frequency permitted by the information processing apparatus, a correction is made using a ratio of the clock frequency at the time of the actual execution to the maximum clock frequency. If the maximum clock frequency as a reference is 40 MHz and the clock frequency selected in the exclusive processing section is fixed at 20 MHz or is 20 MHz on average, the measured execution time is corrected by being multiplied by 20/40=0.5 and saved as the time information in Step S359. In other words, if the execution time was 10 sec. at a clock frequency of 20 MHz, 5 sec. obtained by multiplying 10 sec. by 0.5 is saved as the time information. It should be noted that the clock frequency, which serves as a reference for recording the execution time of an exclusive processing section, can be determined to be an arbitrary value.

On the other hand, in the case that the exclusive processing section is started again before the voltage decreases and, therefore, the voltage has to be increased again as indicated by 257 in FIG. 8, the clock frequency cannot be immediately increased to impair the real-time operability since the voltage does not immediately reach the targeted level 252 in the exclusive processing section. Further, it is not necessary for the power-source controller 212 to change the voltage and for the clock controller 202 to change the clock frequency as the voltage is changed. Accordingly, in the case that another exclusive processing section is started immediately after the exclusive processing section, the clock control judging device 214 may keep the clock frequency high by keeping the voltage at the level 252 without outputting the command to decrease the clock frequency to the clock controller 202.

In order to enable the clock control judging device 214 to judge whether or not another exclusive processing section is to be immediately started, information on the execution times of processing sections from the ends of the exclusive processing sections to the start of the next exclusive processing sections is saved in the storage 204, for example, as shown in FIG. 12. The clock control judging device 214 uses this information by obtaining it from the storage 204. The information in FIG. 12 largely differs from the one in FIG. 9 in that the ending point of a certain exclusive processing section and the starting point of a next exclusive processing section are not in one-to-one correspondence. There can be considered various ways of execution by interrupt processings and the like after the completion of a certain exclusive processing section. Thus, it is necessary to consider all the combinations with the starting points of the next exclusive processing sections. Combinations of the starting points of possible exclusive processing sections with the ending points of the respective interrupt prohibiting sections and the respective preempt prohibiting sections are written at 404 of FIG. 12.

The starts and the ends of the exclusive processing sections are set at a plurality of positions in the processing executed by the computing device 203. Accordingly, it is necessary to specify at which positions the start and the end of the exclusive processing section are located is order to possess the information on the execution times corresponding to the respective combinations. A method for specifying them can be realized by a method similar to the aforementioned method for specifying the exclusive processing sections.

For example, the starts and the ends of the exclusive processing sections detectable by the exclusive processing section detector 213 are extracted beforehand, and a list of identification symbols such as numerical values for specifying the respective starting and ending points is prepared. When the exclusive processing section is started or ended in the software, a corresponding identification symbol in this list is notified to the storage 204. In this way, which exclusive processing section is started or ended can be clearly indicated.

According to another method for specifying the starts and the ends of the exclusive processing sections, they may be specified in one-to-one correspondence based on the internal information of the computing device 203 used at the time of executing an exclusive processing. The internal information of the computing device 203 is, for example, a value of a register used for the internal processing. The computing device 203 notifies the storage 204 of the internal information thereof for specifying the starting and ending points when the exclusive processing section is started and ended.

According to these methods, the information on the execution times of the exclusive processing sections shown in FIG. 12 can be administered by the storage 204.

Pieces of information at 402, 403, 404 of FIG. 12 are pieces of saved time information obtained thus far by executing the respective processing sections from the respective ending points to the corresponding starting points shown at 401. At 402 are shown the times required for the executions of the processing sections last time. At 403 are shown total times required when the processing sections from the respective ending points to the corresponding starting ends were executed and the total numbers of the executions. At 404 are shown average execution times of the processing sections from the respective ending points to the corresponding starting ends, which are calculated based on the total execution times and the total numbers of the executions.

Figure 13:
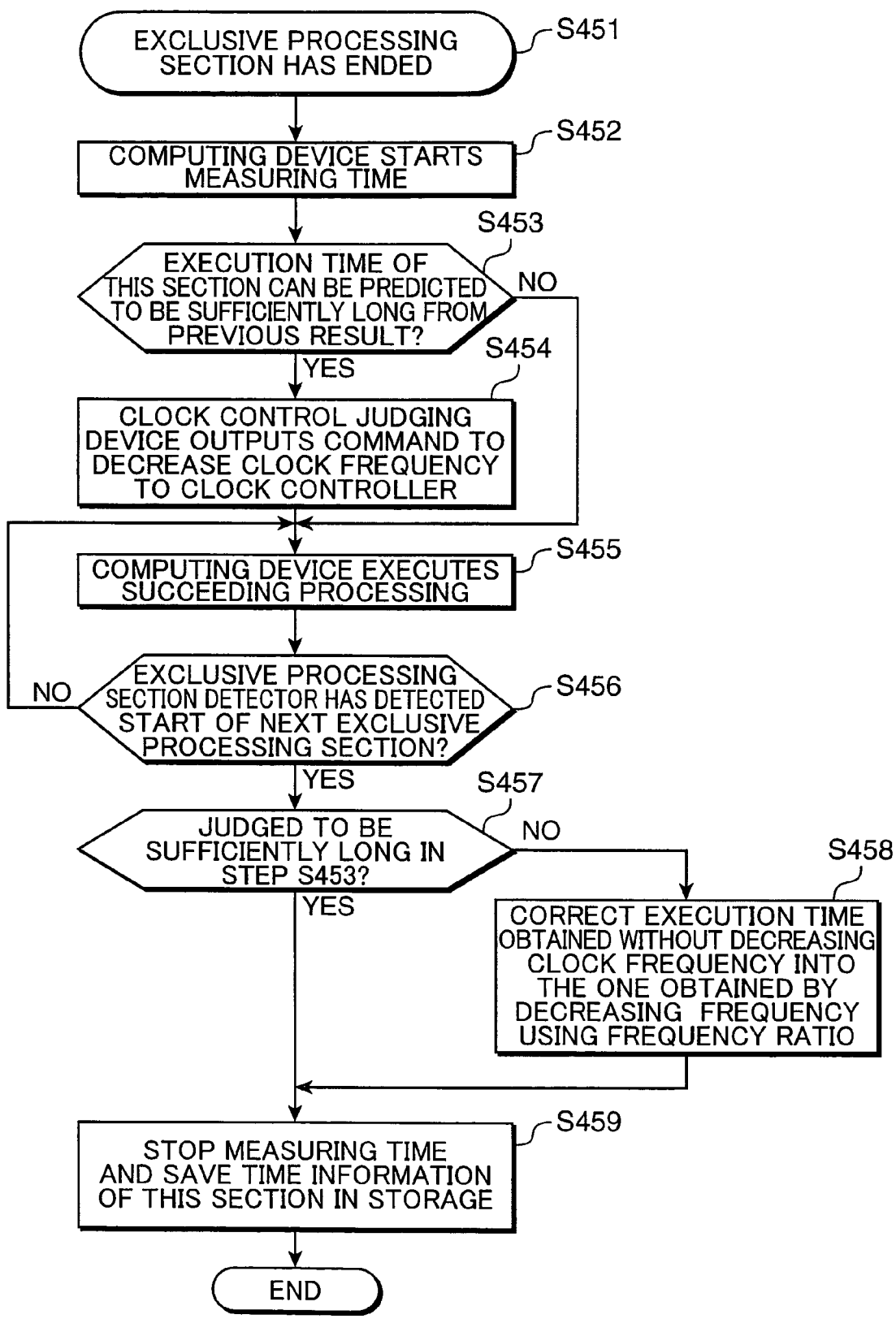
FIG. 13 is a flowchart showing a procedure of a processing in accordance with execution time information when the exclusive processing section is ended.

A procedure of a processing based on the information of the execution time up to the start of a next exclusive processing section when a certain exclusive processing section is ended is described with reference to a flow chart of FIG. 13. First, when the exclusive processing section is ended (Step S451), the computing device 203 starts measuring time in order to grasp the execution time up to the start of the exclusive processing section (Step S452). Subsequently, the computing device 203 judges whether the execution time of the processing section being currently executed is sufficiently long (Step S453). In order to make this judgment, a threshold value for the execution time may be set and compared with a predicted execution time of the exclusive processing section being currently executed.

The threshold value is set in view of the time required for the voltage to decrease. The predicted execution time is obtained based on the information on the execution times from the ending points of exclusive processing sections to the starting points of the next exclusive processing sections shown in FIG. 12. The average execution times shown at 404 may be used or the last execution times shown at 402 may be used. For example, if the threshold value is 10 μsec. and the shortest execution time of those shown at 404 is used as the predicted execution time, the predicted execution time when the interrupt prohibiting section of identification number 1 is ended is shortest when the interrupt prohibiting section of identification number 2 is started as shown in FIG. 12. Since the average execution time of 446.04 μsec. is longer than the threshold value, the execution time of this section is judged to be sufficiently long. Conversely, the predicted execution time when the preempt prohibiting section of identification number 1 is ended is shortest when the interrupt prohibiting section of identification number 1 is started. Since the average execution time of 4.86 μsec. is shorter than the threshold value, the execution time of this section is not judged to be sufficiently long.

If the processing section being executed is judged to be sufficiently long (YES in Step S453), the computing device 203 commands the clock controller 202 to decrease the clock frequency (Step S454) and continues the succeeding processing (Step S455). On the other hand, if the processing section being executed is judged not to be sufficiently long (NO in Step S453), the computing device 203 continues the succeeding processing without decreasing the clock frequency (Step S455).

If the exclusive processing section detector 213 detects the starting point of the exclusive processing section being executed (Step S156), it is judged whether the clock frequency has been decreased in this processing section (Step S457) upon judging that the last execution time was sufficiently long in Step S453. Unless the clock frequency has been decreased (NO in Step S457), the execution time of this processing section is longer by as much as the clock frequency is not decreased. Thus, a ratio of a value to which the clock frequency should have been originally decreased to a value of the actual clock frequency is taken and the execution time is corrected by the one obtained by executing the processing section while decreasing the clock frequency using this ratio (Step S459). For example, if this processing section is executed at a high clock frequency of 40 MHz although the clock frequency was set to be decreased to 4 MHz, the clock frequency ratio is 1/10 and the execution time is corrected by being multiplied by 10. Thereafter, the information on the time required for the execution is saved (Step S459) after the measurement of the time of this processing section is completed. For example, the information on the last execution time at 402 and the average execution time at 404 as shown in FIG. 12 may be renewed.

It should be noted that a predicted execution time obtained upon assuming that the processing section was executed by decreasing the clock frequency is desirably selected as the predicted execution time to be compared with the threshold value. Further, the time required for the power-source controller 212 to decrease the voltage, i.e., the voltage-decreasing time, itself may be set as the threshold value. Furthermore, a time obtained by adding a certain margin to the voltage-decreasing time may be set as the threshold value. Further, a sum of the voltage-decreasing time and a time required for the power-source controller 212 to increase the voltage, i.e., a voltage-increasing time, may be set as the threshold value. Furthermore, a time obtained by adding a certain margin to the above sum may be set as the threshold value. A decrease in the clock frequency can be avoided with corresponding degrees of certainty even in the case of a weak effect of saving the power consumption.

Further, instead of the voltage-increasing time to be reflected on the threshold value, a frequency-increasing time which is a time required for the clock controller 202 to increase the clock frequency may be used. Similarly, instead of the voltage-decreasing time to be reflected on the threshold value, a frequency-decreasing time which is a time required for the clock controller 202 to decrease the clock frequency may be used.

FIG. 14 is a graph showing a state of a change of the clock frequency when it takes time to change the clock frequency. In FIG. 14, a certain time is required for the clock frequency to decrease from a high value 511 to a low value 512. Similarly, a certain time is required for the clock frequency to increase from the low value 512 to the high value 511. A state of a change of the voltage when it takes time to change the voltage will be shown similar to the one shown in FIG. 14.

The reflection of the voltage-increasing time and the voltage-decreasing time on the threshold value takes into account that it takes time until the voltage is changed after the power-source controller 212 receives an instruction. Further, the reflection of the frequency-increasing time and the frequency-decreasing time on the threshold value takes into account that it takes time until the frequency is changed after the power-source controller 212 receives an instruction. The procedure of FIG. 13 described above premises that the execution of the program is in pause during the time required to change the voltage or to change the clock frequency. A predicted execution time at the time of decreasing the clock frequency in FIG. 14 corresponds to a period during which the clock frequency is constant at the low value 512, i.e., a period from time 513 to time 514.

The procedure of the processing until the next exclusive processing section is started after the exclusive processing section is ended is described with reference to FIG. 13. In the case that a plurality of combinations of the voltages and the corresponding clock frequencies can be taken, such voltage and clock frequency as to make a section between the end of an exclusive processing section and the start of the next exclusive processing section longest can be selected in the operations of Steps S463 and S454.

A method for selecting the optimal voltage and clock frequency in Steps S453 and 454 is described below. First, the time required for the voltage to decrease from the level 252 to the level 251 shown in FIG. 8 and stabilize is determined by the current voltage level and the voltage level after the change, a voltage decreasing speed, i.e., the inclination of a voltage-to-time curve. Further, the predicted execution time of the exclusive processing section is determined by a predicted execution time based on a certain clock frequency and the clock frequency after the change. The clock frequency after the change is determined by the voltage level after the change since being a maximum clock frequency corresponding to the voltage level after the change. As a result, such a voltage level as to maximize the predicted execution time may be selected on a condition that the predicted execution time from the end of the exclusive processing section to the start of the next exclusive processing section is longer than the voltage-decreasing time. The maximum clock frequency corresponding to this voltage level is an optimal clock frequency.

More specifically, the above procedure premises that the program cannot be executed while the voltage is being increased or decreased. In other words, the above procedure premises that the program is executed only in the periods during which the voltage level is flat in FIG. 14. On this premise, the above procedure is designed to decrease the clock frequency to the one corresponding to the optimal voltage in view of a relationship between the voltage-decreasing speed and voltage-increasing speed, i.e., the voltage-decreasing time and voltage-increasing time, and the time required to execute the exclusive processing section at the decreased clock frequency other than simply changing the voltage and the clock frequency between two values corresponding to the "high-speed processing mode" and the "low power-consuming mode".

A specific example is given below. It is assumed that an execution time up to the start of a next exclusive processing section after the end of the "high-speed processing mode" in which the computing device 203 executed the processing at a speed of 60 MHz, i.e., an execution time of a nonexclusive processing section is 10 sec. In such a case, if the clock frequency is decreased to 20 MHz, the execution time of the nonexclusive processing section is predicted to be 30 sec. by a simple calculation. However, if it is assumed that a period of 5 sec. is required to decrease the voltage in order to decrease the clock frequency by 10 MHz, a total period of 40 sec. is required to decrease the clock frequency from 60 MHz to 20 MHz and then increase it. In other words, an execution time of 30 sec. required when the nonexclusive processing section was executed by decreasing the clock frequency is shorter than 40 sec. In such a case, the effect of saving the power consumption by decreasing the clock frequency is weak and, therefore, the clock frequency may not be decreased.

On the other hand, a total period of 10 sec. is sufficient to decrease the clock frequency from 60 MHz to 50 MHz and then increase it in the case of decreasing the clock frequency not to 20 MHz, but to 40 MHz. If the clock frequency is 50 MHz, the execution time of the nonexclusive processing section is 12 sec. In other words, a period of 12 sec. required to execute the nonexclusive processing section by decreasing the clock frequency to 50 MHz is longer than a period of 10 sec. required to decrease and increase the clock frequency. In such a case, the effect of saving the power consumption by decreasing the clock frequency is high, and the clock frequency may be decreased, for example, up to 50 MHz.

In this way, the optimal clock frequency to be decrease can be selected within a predetermined range. Specifically, if an effective frequency, which is a clock frequency at which the predicted time in the case of executing the nonexclusive processing section by decreasing the clock frequency is longer than the time required for the voltage to return to the initial high value or a time obtained by adding a certain margin to the former time, lies within the predetermined range, the clock frequency may be decreased to the effective frequency. Unless the effective frequency lies within the predetermined range, the clock frequency may not be decreased. The predetermined range may be a discontinuous range for enabling the clock frequency to be changed in a stepwise manner or a continuous range. If a predicted value of the execution time of the nonexclusive processing section is obtained for one clock frequency, the execution time of the nonexclusive processing section and the times required to increase and decrease the voltage can be obtained for another arbitrary clock frequency by simple calculations.

In the case of selecting such voltage and clock frequency as to maximize the section from the end of the exclusive processing section to the start of the next exclusive processing section in this way, the execution time measured in accordance with the selected clock frequency needs to be corrected in the operations of Steps S457 and S458. The time information saved in Step S459 is time information measured based on a certain specific clock frequency. For example, in the case that the execution time from the end of the exclusive processing section to the start of the next exclusive processing section is measured based on a minimum clock frequency permitted by the information processing apparatus, a correction is made using a ratio of the clock frequency at the time of the actual execution to the minimum clock frequency. If the minimum clock frequency as a reference is 4 MHz and the clock frequency selected in the exclusive processing section is fixed at 20 MHz or is 20 MHz on the average, the measured execution time is corrected by being multiplied by 20/4 and saved as the time information in Step S459. In other words, if the execution time was 10 sec. at a clock frequency of 20 MHz, 50 sec. obtained by multiplying 10 sec. by 5 is saved as the time information. It should be noted that the clock frequency, which serves as a reference for recording the execution time of the exclusive processing section, can be determined to be an arbitrary value.

(Other Embodiments)

In the foregoing embodiments, the clock frequency is changed in the exclusive processing sections and the other processing sections. However, the information processing apparatus may be so constructed as to generally execute a processing similar to the one in the above exclusive processing sections for specific processing sections. It is possible to, similar to the exclusive processing sections, insert codes, which specify sections for executing a certain specific processing and notify identification names, into a program to be prepared or an already prepared program. Thus, the start and the end of a specific processing section can be detected during the execution of the program by a specific processing section detector which operates similar to the exclusive processing section detector 110 or 213.

Further, the information processing apparatus may be constructed such that the exclusive processing section detector 110 or 213 detects only predetermined specific exclusive processing sections out of a multitude of exclusive processing sections in the program. For example, even if a preempt prohibiting section is being executed, another process may not normally exist depending on the condition of the processing including this section. In such a case, it is not necessary to prohibit the preempt. It is possible to insert codes, which specify only one or a plurality of specific sections out of various exclusive processing sections, in a program to be prepared or an already prepared program. Thus, the exclusive processing section detector 110 or 213 can detect the starts and the ends of the specific ones of the exclusive processing sections during the execution of the program. Further, according to the method based on the state of the hardware, a function-calling relationship can, for example, register (or delete) a specific exclusive processing section based on a trace of a stack, or can register (or delete) the processing at that time if a certain register is in a specific state.

(Brief Summary of Embodiments)

(1) An information processing apparatus, comprises: a clock generator for generating a clock, a clock controller for controlling the clock generated by the clock generator to determine a clock frequency, a storage for storing a software, a computing device for implementing software obtained from the storage in accordance with the clock supplied via the clock controller, a specific processing section detector for detecting the start and end of a specific processing section which is a section during which a predetermined specific processing is executed, and a clock control judging device for outputting a command to control the clock frequency to the clock controller in accordance with a result obtained by the specific processing section detector, wherein the clock control judging device commands the clock controller to increase the clock frequency if the specific processing section detector has detected the start of the specific processing section while commanding the clock controller to decrease the clock frequency if the specific processing section detector has detected the end of the specific processing section.

In this information processing apparatus, the clock control judging device commands the clock controller to increase the clock frequency if the specific processing section detector has detected the start of the specific processing section while commanding the clock controller to decrease the clock frequency if the specific processing section detector has detected the end of the specific processing section. The computing device implements the software stored in the storage in accordance with the clock controlled by the clock controller. Accordingly, by setting a processing required to have a real-time operability as the specific processing, power consumption can be reduced while the real-time operability of the processing is ensured.

(2) An information processing apparatus is the apparatus (1), wherein the specific processing section is a section during which an exclusive processing is executed.

In this information processing apparatus, since the specific processing section is a section during which an exclusive processing required as usual to have the real-time operability is execute, power consumption can be reduced while the real-time operability of the processing is ensured.

(3) An information processing apparatus is the apparatus (1), wherein the specific processing section is a predetermined specific section out of a plurality of sections during which exclusive processings are executed.

In this information processing apparatus, since the specific processing section is the predetermined specific section out of the plurality of sections during which the exclusive processings are executed, it can be avoided to unnecessarily increase a power consumption to speed up the processing time also for the sections which are not necessarily required to have the real-time operability out of the plurality of sections during which the exclusive processings are executed. Thus, an effect of saving the power consumption can be further improved while the real-time operability of the processing is ensured.

(4) An information processing apparatus is any of the apparatuses (1) to (3), which further comprises a power-source controller for controlling a voltage to be supplied to the computing device and the storage upon obtaining clock frequency information from the clock controller, wherein the power-source controller increases the voltage when the clock frequency is increased while decreasing the voltage when the clock frequency is decreased.

In this information processing apparatus, since the power-source controller increases the voltage to be supplied to the computing device and the storage when the clock controller increases the clock frequency while decreasing the voltage when the clock controller decreases the clock frequency, the power consumption can be further effectively reduced while the real-time operability of the processing is ensured.

(5) An information processing apparatus is the apparatus (4), wherein the clock controller increases the clock frequency in a stepwise manner within a range where the computing device is operable as the voltage is increased by the power-source controller.

In this information processing apparatus, since the computing device increases the clock frequency in a stepwise manner within the range where the computing device is operable as the voltage is increased by the power-source controller, the computing device can execute the processing even in the process of increasing the voltage. Thus, the real-time operability of the processing can be more effectively ensured.

(6) An information processing apparatus is the apparatus (4), wherein the clock control judging device: predicts a specific processing time, which is a time up to the end of the specific processing section, based on a time required for a previous specific processing if the specific processing section detector has detected the start of the specific processing section, notifies a command to increase the clock frequency to the clock controller when the predicted specific processing time exceeds a threshold value, and does not notify the command to increase the clock frequency to the clock controller when the predicted specific processing time is below the threshold value.

In this information processing apparatus, if the specific processing section detector has detected the start of the specific processing section, the clock control judging device predicts the specific processing time based on the time required for the previous specific processing, notifies the command to increase the clock frequency to the clock controller when the predicted specific processing time exceeds the threshold value and does not notifies the command to increase the clock frequency when the predicted specific processing time is below the threshold value. Thus, it can be avoided to increase the clock frequency even in the case where the real-time operability is adversely affected or the effect of ensuring the real-time operability is weak even if the clock frequency is increased to complete the specific processing within a shorter period.

(7) An information processing apparatus is the apparatus (6), wherein the clock control judging device sets a time dependent on and equal to or longer than a voltage-increasing time required for the power-source controller to increase the voltage as the threshold value.

In this information processing apparatus, since the clock control judging device sets the time dependent on and equal to or longer than the voltage-increasing time as the threshold value, it can be more properly avoided to increase the clock frequency even in the case where an increase in the clock frequency adversely affects the real-time operability or brings about a weak effect.

(8) An information processing apparatus is the apparatus (7), wherein the clock control judging device sets a time dependent on and equal to or longer than a sum of the voltage-increasing time and a voltage-decreasing time required for the power-source controller to decrease the voltage as the threshold value.

In this information processing apparatus, since the clock control judging device sets the time dependent on and equal to or longer than the sum of the voltage-increasing time and the voltage-decreasing time as the threshold value, it can be even more properly avoided to increase the clock frequency even in the case where an increase in the clock frequency adversely affects the real-time operability or brings about a weak effect.

(9) An information processing apparatus is the apparatus (6), wherein the clock control judging device sets a time dependent on and equal to or longer than a frequency-increasing time required for the clock controller to increase the clock frequency as the threshold value.

In this information processing apparatus, since the clock control judging device sets the time dependent on and equal to or longer than the frequency-increasing time as the threshold value, it can be more properly avoided to increase the clock frequency even in the case where an increase in the clock frequency adversely affects the real-time operability or brings about a weak effect.

(10) An information processing apparatus is the apparatus (9), wherein the clock control judging device sets a time dependent on and equal to or longer than a sum of the frequency-increasing time and a frequency-decreasing time required for the clock controller to decrease the clock frequency as the threshold value.

In this information processing apparatus, since the clock control judging device sets the time dependent on and equal to or longer than the sum of the frequency-increasing time and the frequency-decreasing time as the threshold value, it can be even more properly avoided to increase the clock frequency even in the case where an increase in the clock frequency adversely affects the real-time operability or brings about a weak effect.

(11) An information processing apparatus is the apparatus (4), wherein the clock control judging device: predicts a low-speed specific processing time which is a time up to the end of the specific processing section when the clock frequency is kept low and a high-speed specific processing time which is a time up to the end of the specific processing section when the clock frequency is increased, based on a time required for a previous specific processing if the specific processing section detector has detected the start of the specific processing section, and notifies a command to increase the clock frequency to the clock controller when the predicted low-speed specific processing time exceeds a threshold value dependent on and equal to or longer than a sum of the predicted high-speed specific processing time and a voltage-changing time required for the power-source controller to increase and decrease the voltage, and does not notify the command to increase the clock frequency to the clock controller when the predicted low-speed specific processing time is below the threshold value.

In this information processing apparatus, if the specific processing section detector has detected the start of the specific processing section, the clock control judging device predicts the high-speed specific processing time based on the time required for the previous specific processing, and notifies a command to increase the clock frequency to the clock controller when the predicted low-speed specific processing time exceeds a threshold value dependent on and equal to or longer than a sum of the predicted high-speed specific processing time and the voltage-changing time, and does not notify the command to increase the clock frequency to the clock controller when the predicted low-speed specific processing time is below the threshold value. Thus, it can be even more properly avoided to increase the clock frequency even in the case where an increase in the clock frequency adversely affects the real-time operability or brings about a weak effect.

(12) An information processing apparatus is the apparatus (4), wherein the clock control judging device: predicts a low-speed specific processing time which is a time up to the end of the specific processing section when the clock frequency is kept low and a high-speed specific processing time which is a time up to the end of the specific processing section when the clock frequency is increased, based on a time required for a previous specific processing if the specific processing section detector has detected the start of the specific processing section, and notifies a command to increase the clock frequency to the clock controller when the predicted low-speed specific processing time exceeds a threshold value dependent on and equal to or longer than a sum of the predicted high-speed specific processing time and a frequency-changing time required for the clock controller to increase and decrease the clock frequency, and does not notify the command to increase the clock frequency to the clock controller when the predicted low-speed specific processing time is below the threshold value.

In this information processing apparatus, if the specific processing section detector has detected the start of the specific processing section, the clock control judging device predicts the high-speed specific processing time based on the time required for the previous specific processing, and notifies a command to increase the clock frequency to the clock controller when the predicted low-speed specific processing time exceeds a threshold value dependent on and equal to or longer than a sum of the predicted high-speed specific processing time and the frequency-changing time, and does not notify the command to increase the clock frequency to the clock controller when the predicted low-speed specific processing time is below the threshold value. Thus, it can be even more properly avoided to increase the clock frequency even in the case where an increase in the clock frequency adversely affects the real-time operability or brings about a weak effect.

(13) An information processing apparatus is the apparatus (4), wherein the clock control judging device: predicts a high-speed specific processing time, which is a time up to the end of the specific processing section when the clock frequency is increased within a predetermined range, and a low-speed specific processing time, which is a time up to the and of the specific processing section when the clock frequency is kept low, based on a time required for a previous processing if the specific processing section detector has detected the start of the specific processing section, notifies a command to increase the clock frequency to an effective frequency to the clock controller when the effective frequency, at which the predicted low-speed specific processing time is longer than a threshold value dependent on and equal to or longer than a sum of the predicted high-speed specific processing time and a voltage-changing time required for the power-source controller to increase and decrease the voltage, lies within the predetermined range, and does not notify the command to increase the clock frequency to the clock controller when the effective frequency lies beyond the predetermined range.

In this information processing apparatus, if the specific processing section detector has detected the start of the specific processing section, the clock control judging device notifies the command to increase the clock frequency to the effective frequency to the clock controller when the effective frequency, at which the predicted low-speed specific processing time is longer than the threshold value dependent on and equal to or longer than the sum of the predicted high-speed specific processing time and the voltage-changing time, lies within the predetermined range, and does not notify the command to increase the clock frequency to the clock controller when the effective frequency lies beyond the predetermined range. Thus, a clock frequency preferable in executing the specific processing within a shorter period can be selected from the predetermined range and a frequency kept low. Therefore, both the real-time operability of the processing and the saving of the power consumption can be more properly realized.

(14) An information processing apparatus is the apparatus (13), wherein the clock control judging device, if a plurality of frequencies as the effective frequency lie within the predetermined range, then notifies a command to increase the clock frequency up to the highest one of the plurality of frequencies to the clock controller.

In this information processing apparatus, the clock control judging device, if a plurality of frequencies as the effective frequency lie within the predetermined range, then notifies a command to increase the clock frequency up to the highest one of the plurality of frequencies to the clock controller. In other words, the clock frequency that enables the specific processing to be executed in the shortest time is selected. Therefore, both the real-time operability of the processing and the saving of the power consumption can be further more properly realized.

(15) An information processing apparatus is the apparatus (4), wherein the clock control judging device: predicts a high-speed specific processing time, which is a time up to the end of the specific processing section when the clock frequency is increased within a predetermined range, and a low-speed specific processing time, which is a time up to the end of the specific processing section when the clock frequency is kept low, based on a time required for a previous processing if the specific processing section detector has detected the start of the specific processing section, notifies a command to increase the clock frequency to an effective frequency to the clock controller when the effective frequency, at which the predated low-speed specific processing time is longer than a threshold value dependent on and equal to or longer than a sum of the predicted high-speed specific processing time and a frequency-changing time required for the clock controller to increase and decrease the clock frequency, lies within the predetermined range, and does not notify the command to increase the clock frequency to the clock controller when the effective frequency lies beyond the predetermined range.

In this information processing apparatus, if the specific processing section detector has detected the start of the specific processing section, the clock control judging device notifies the command to increase the clock frequency to the effective frequency to the clock controller when the effective frequency, at which the predicted low-speed specific processing time is longer than the threshold value dependent on and equal to or longer than the sum of the predicted high-speed specific processing time and the frequency-changing time, lies within the predetermined range, and does not notify the command to increase the clock frequency to the clock controller when the effective frequency lies beyond the predetermined range. Thus, a clock frequency preferable in executing the specific processing within a shorter period can be selected from the predetermined range and a frequency kept low. Therefore, both the real-time operability of the processing and the saving of the power consumption can be more properly realized.

(16) An information processing apparatus is the apparatus (4), wherein the clock control judging device: predicts a low-speed nonspecific processing time, which is a time up to the next detection of the start of the specific processing section when the clock frequency is decreased, based on a time required for a previous processing if the specific processing section detector has detected the end of the specific processing time, and notifies a command to decrease the clock frequency to the clock controller when the predicted low-speed nonspecific processing time exceeds a threshold value and does not notify the command to decrease the clock frequency to the clock controller when the predicted low-speed nonspecific processing time is below the threshold value.

In this information processing apparatus, if the specific processing section detector has detected the end of the specific processing section, the clock control judging device predicts the low-speed nonspecific processing time based on the time required for the previous processing, notifies the command to decrease the clock frequency to the clock controller when the predicted low-speed nonspecific processing time exceeds the threshold value and does not notify the command to decrease the clock frequency to the clock controller when the predicted low-speed nonspecific processing time is below the threshold value. Thus, it can be avoided to decrease the clock frequency even in the case where the effect of saving the power consumption by decreasing the clock frequency is weak.

(17) An information processing apparatus is the apparatus (16), wherein the clock control judging device sets a time dependent on and equal to or longer than a voltage-decreasing time required for the power-source controller to decrease the voltage as the threshold value.

In this information processing apparatus, since the clock control judging device sets the time dependent on and equal to or longer than the voltage-decreasing time as the threshold value, it can be more properly avoided to decrease the clock frequency even in the case where the effect of saving the power consumption is weak.

(18) An information processing apparatus is the apparatus (17), wherein the clock control judging device sets a time dependent on and equal to or longer than a sum of the voltage-decreasing time and a voltage-increasing time required for the power-source controller to increase the voltage as the threshold value.

In this information processing apparatus, since the clock control judging device sets the time dependent on and equal to or longer than the sum of the voltage-decreasing time and the voltage-increasing time as the threshold value, it can be even more properly avoided to decrease the clock frequency even in the case where the effect of saving the power consumption is weak.

(19) An information processing apparatus is the apparatus (16), wherein the clock control judging device sets a time dependent on and equal to or longer than a frequency-decreasing time required for the clock controller to decrease the clock frequency as the threshold value.

In this information processing apparatus, since the clock control judging device sets the time dependent on and equal to or longer than the frequency-decreasing time as the threshold value, it can be more properly avoided to decrease the clock frequency even in the case where the effect of saving the power consumption is weak.

(20) An information processing apparatus is the apparatus (19), wherein the clock control judging device sets a time dependent on and equal to or longer than a sum of the frequency-decreasing time and a frequency-increasing time required for the clock controller to increase the clock frequency as the threshold value.

In this information processing apparatus, since the clock control judging device sets the time dependent on and equal to or longer than the sum of the frequency-decreasing time and the frequency-increasing time as the threshold value, it can be even more properly avoided to decrease the clock frequency even in the case where the effect of saving the power consumption is weak.

(21) An information processing apparatus is the apparatus (4), wherein the clock control judging device: predicts a low-speed nonspecific processing time, which is a time up to the start of the next specific processing section when the clock frequency is decreased within a predetermined range, based on a time required for a previous processing other than the specific processing if the specific processing section detector has detected the end of the specific processing section, notifies a command to decrease the clock frequency to an effective frequency to the clock controller when the effective frequency, at which the predicted low-speed nonspecific processing time is longer than a threshold value dependent on and equal to or longer than a voltage-changing time required for the power-source controller to decrease and increase the voltage, lies within the predetermined range, and does not notify the command to decrease the clock frequency to the clock controller when the effective frequency lies beyond the predetermined range.

In this information processing apparatus, if the specific processing section detector has detected the end of the specific processing section, the clock control judging device notifies the command to decrease the clock frequency up to the effective frequency to the clock controller when the effective frequency, at which the predicted low-speed nonspecific processing time is longer than the threshold value dependent on and equal to or longer than the voltage-changing time, lies within the predetermined range, and does not notify the command to decrease the clock frequency to the clock controller when the effective frequency lies beyond the predetermined range. Thus, a clock frequency preferable in saving the power consumption can be selected from the predetermined range and a frequency kept high. Therefore, both the real-time operability of the processing and the saving of the power consumption can be more properly realized.

(22) An information processing apparatus is the apparatus (21), wherein the clock control judging device, if a plurality of frequencies as the effective frequency lie within the predetermined range, then notifies a command to decrease the clock frequency down to the lowest one of the plurality of frequencies to the clock controller.

In this information processing apparatus, the clock control judging device, if a plurality of frequencies as the effective frequency lie within the predetermined range, then notifies a command to decrease the clock frequency down to the lowest one of the plurality of frequencies to the clock controller. In other words, the clock frequency best desirable in saving the power consumption is selected. Therefore, both the real-time operability of the processing and the saving of the power consumption can be further more properly realized.

(23) An information processing apparatus is the apparatus (4), wherein the clock control judging device: predicts a low-speed nonspecific processing time, which is a time up to the start of the net specific processing section when the clock frequency is decreased within a predetermined range, based on a time required for a previous processing other than the specific processing if the specific processing section detector has detected the end of the specific processing section, notifies a command to decrease the clock frequency to an effective frequency to the clock controller when the effective frequency, at which the predicted low-speed nonspecific processing time is longer than a threshold value dependent on and equal to or longer than a frequency-changing time required for the clock controller to decrease and increase the clock frequency, lies within the predetermined range, and does not notify the command to decrease the clock frequency to the clock controller when the effective frequency lies beyond the predetermined range.

In this information processing apparatus, if the specific processing section detector has detected the end of the specific processing section, the clock control judging device notifies the command to decrease the clock frequency to the effective frequency to the clock controller when the effective frequency, at which the predicted low-speed nonspecific processing time is longer than the threshold value dependent on and equal to or longer than the frequency-changing time, lies within the predetermined range, and does not notify the command to decrease the clock frequency to the clock controller when the effective frequency lies beyond the predetermined range. Thus, a clock frequency preferable in saving the power consumption can be selected from the predetermined range and a frequency kept high. Therefore, both the real-time operability of the processing and the saving of the power consumption can be more properly realized.

(24) An electrical apparatus comprises any of the information processing apparatuses (1) to (23).

Since the electrical apparatus comprises the inventive information processing apparatus, both the real-time operability of the processing executed by the information processing apparatus and the saving of the power consumption can be realized.

(25) A clock controlling method for an information processing apparatus, comprises: a specific processing section detecting step of detecting the start and end of a specific processing section which is a section during which a predetermined specific processing is executed, and a clock controlling step of increasing a clock frequency of the information processing apparatus when the start of the specific processing section is detected in the specific processing section detecting step while decreasing the clock frequency when the end of the specific processing section is detected in the specific processing section detecting step.

According to this method, the clock frequency of the in formation processing apparatus is increased in the clock controlling step if the start of the specific processing section is detected in the specific processing section detecting step, whereas the clock frequency is decreased in the clock controlling step if the end of the specific processing section is detected in the specific processing section detecting step. Thus, both the real-time operability of the processing and the saving of the power consumption can be realized.

(26) A clock controlling program is for causing an information processing apparatus to realize: a specific processing section detecting function of detecting the start and end of a specific processing section which is a section during which a predetermined specific processing is executed, and a clock controlling function of increasing a clock frequency of the information processing apparatus when the start of the specific processing section is detected in the specific processing section detecting function while decreasing the clock frequency when the end of the specific processing section is detected in the specific processing section detecting function.

Since this clock controlling program causes the in formation processing apparatus to realize the functions of the inventive in formation processing apparatus, both the real-time operability of the processing and the saving of the power consumption can be realized.

(27) A program product, comprises: a clock controlling program for causing an information processing apparatus to realize: a specific processing section detecting function of detecting the start and end of a specific processing section which is a section during which a predetermined specific processing is executed, and a clock controlling function of increasing a clock frequency of the information processing apparatus when the start of the specific processing section is detected in the specific processing section detecting function while decreasing the clock frequency when the end of the specific processing section is detected in the specific processing section detecting function, and a signal holding medium for holding the program.

Since the inventive clock controlling program is held in the signal holding medium, both the real-time operability of the processing and the saving of the power consumption can be realized by having the program read by the information processing apparatus.

(28) A program product is the program product (27), wherein the signal holding medium is at least one of a storage medium and a transmission medium.

This application is based on Japanese patent application serial No. 2003-085042, filed in Japan Patent Office on Mar. 26, 2003, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An information processing apparatus comprising:
a clock generator for generating a clock;
a clock controller for controlling the clock generated by the clock generator to determine a clock frequency;
a storage device for storing software;

a computing device for implementing the software obtained from the storage device in accordance with the clock supplied via the clock controller;

a specific processing section detector for detecting a start and an end of a specific processing section which is a section during which a predetermined specific processing is executed; and a clock control judging device for outputting a command to control the clock frequency to the clock controller in accordance with a result obtained by the specific processing section detector, wherein the specific processing section detector is operable to detect the start of the specific processing section upon entering the specific processing section from a normal processing section during which the specific processing is not executed and the end of the specific processing section upon returning from the specific processing section to the normal processing section, and the clock control judging device is operable to command clock controller to increase the clock frequency if the specific processing section detector has detected the start of the specific processing section and command the clock controller to decrease the clock frequency if the specific processing section detector has detected the end of the specific processing section.

2. An information processing apparatus according to claim 1, wherein the specific processing section includes an exclusive processing section during which an exclusive processing is executed.

3. An information processing apparatus according to claim 1, wherein the specific processing section is a predetermined specific section out of a plurality of sections during which exclusive processings are executed.

4. An information processing apparatus according to claim 1, further comprising a power-source controller for controlling a voltage to be supplied to the computing device and the storage device upon obtaining clock frequency information from the clock controller, wherein the power-source controller is operable to increase the voltage when the clock frequency is increased and decrease the voltage when the clock frequency is decreased.

5. An information processing apparatus according to claim 4, wherein the clock controller is operable to increase the clock frequency in a stepwise manner within a range where the computing device is operable as the voltage is increased by the power-source controller.

6. An information processing apparatus according to claim 4, wherein the clock control judging device is operable to:

predict a specific processing time, which is a time up to the end of the specific processing section, based on a previous specific processing time required for a previous specific processing if the specific processing section detector has detected the start of the specific processing section, and output an increasing command for increasing the clock frequency to the clock controller when the predicted specific processing time exceeds a threshold value.

7. An information processing apparatus according to claim 6, wherein the clock control judging device is operable to set a time dependent on and equal to or longer than a voltage-increasing time required for the power-source controller to increase the voltage as the threshold value.

8. An information processing apparatus according to claim 6, wherein the clock control judging device is operable to set a time dependent on and equal to or longer than a sum of a voltage-increasing time required for the power-source controller to increase the voltage and a voltage-decreasing time required for the power-source controller to decrease the voltage as the threshold value.

9. An information processing apparatus according to claim 6, wherein the clock control judging device is operable to set a time dependent on and equal to or longer than a frequency-increasing time required for the clock controller to increase the clock frequency as the threshold value.

10. An information processing apparatus according to claim 6, wherein the clock control judging device is operable to set a time dependent on and equal to or longer than a sum of a frequency-increasing time required for the clock controller to increase the clock frequency and a frequency-decreasing time required for the clock controller to decrease the clock frequency as the threshold value.

11. An information processing apparatus according to claim 4, wherein the clock control judging device is operable to:

predict a low-speed specific processing time which is a low-speed time up to the end of the specific processing section when the clock frequency is kept low and a high-speed specific processing time which is a high-speed time up to the end of the specific processing section when the clock frequency is increased, based on a previous specific processing time required for a previous specific processing if the specific processing section detector has detected the start of the specific processing section, and output an increasing command for increasing the clock frequency to the clock controller when the predicted low-speed specific processing time exceeds a threshold value dependent on and equal to or longer than a sum of the predicted high-speed specific processing time and a voltage-changing time required for the power-source controller to increase and decrease the voltage.

12. An information processing apparatus according to claim 4, wherein the clock control judging device is operable to:

predict low-speed specific processing time which is a low-speed time up to the end of the specific processing section when the clock frequency is kept low and a high-speed specific processing time which is a high-speed time up to the end of the specific processing section when the clock frequency is increased, based on a previous specific processing time required for a previous specific processing if the specific processing section detector has detected the start of the specific processing section, and output an increasing command increasing the clock frequency to the clock controller when the predicted low-speed specific processing time exceeds a threshold value dependent on and equal to or longer than a sum of the predicted high-speed specific processing time and a frequency-changing time required for the clock controller to increase and decrease the clock frequency.

13. An information processing apparatus according to claim 4, wherein the clock control judging device is operable to:

predict a high-speed specific processing time, which is a high-speed time up to the end of the specific processing section when the clock frequency is increased within a predetermined range, and a low-speed specific processing time, which is a low-speed time up to the end of the specific processing section when the clock frequency is kept low, based on a previous specific processing time required for a previous processing if the specific processing section detector has detected the start of the specific processing section, and output an increasing command for increasing the clock frequency to an effective frequency to the clock controller when the effective frequency, at which the predicted low-speed specific processing time is longer than a threshold value dependent on and equal to or longer than a sum of the predicted high-speed specific processing time and a voltage-changing time required for the power-source controller to increase and decrease the voltage, lies within the predetermined range.

14. An information processing apparatus according to claim 13, wherein the clock control judging device, if a plurality of frequencies as the effective frequency lie within the predetermined range, is operable to output a highest increasing command for increasing the clock frequency up to a highest one of the plurality of frequencies to the clock controller.

15. An information processing apparatus according to claim 4, wherein the clock control judging device is operable to:

predict a high-speed specific processing time, which is a high-speed time up to the end of the specific processing section when the clock frequency is increased within a predetermined range, and a low-speed specific processing time, which is a low-speed time up to the end of the specific processing section when the clock frequency is kept low, based on a previous specific processing time required for a previous processing if the specific processing section detector has detected the start of the specific processing section, and output an increasing command for increasing the clock frequency to an effective frequency to the clock controller when the effective frequency, at which the predicted low-speed specific processing time is longer than a threshold value dependent on and equal to or longer than a sum of the predicted high-speed specific processing time and a frequency-changing time required for the clock controller to increase and decrease the clock frequency, lies within the predetermined range.

16. An information processing apparatus according to claim 4, wherein the clock control judging device is operable to:

predict a low-speed nonspecific processing time, which is a low-speed time up to a next detection of the start of the specific processing section when the clock frequency is decreased, based on a previous processing time required for a previous processing if the specific processing section detector has detected the end of the specific processing time, and output a decreasing command for decreasing the clock frequency to the clock controller when the predicted low-speed nonspecific processing time exceeds a threshold value.

17. An information processing apparatus according to claim 16, wherein the clock control judging device is operable to set a time dependent on and equal to or longer than a voltage-decreasing time required for the power-source controller to decrease the voltage as the threshold value.

18. An information processing apparatus according to claim 16, wherein the clock control judging device is operable to set a time dependent on and equal to or longer than a sum of a voltage-decreasing time required for the power-source controller to decrease the voltage and a voltage-increasing time required for the power-source controller to increase the voltage as the threshold value.

19. An information processing apparatus according to claim 16, wherein the clock control judging device is operable to set a time dependent on and equal to or longer than a frequency-decreasing time required for the clock controller to decrease the clock frequency as the threshold value.

20. An information processing apparatus according to claim 16, wherein the clock control judging device is operable to set a time dependent on and equal to or longer than a sum of a frequency-decreasing time required for the clock controller to decrease the clock frequency and a frequency-increasing time required for the clock controller to increase the clock frequency as the threshold value.

21. An information processing apparatus according to claim 4, wherein the clock control judging device is operable to:

predict a low-speed nonspecific processing time, which is a low-speed time up to a start of a next specific processing section when the clock frequency is decreased within a predetermined range, based on a previous processing time required for a previous processing other than the specific processing if the specific processing section detector has detected the end of the specific processing section, and output a decreasing command for decreasing the clock frequency to an effective frequency to the clock controller when the effective frequency, at which the predicted low-speed nonspecific processing time is longer than a threshold value dependent on and equal to or longer than a voltage-changing time required for the power-source controller to decrease and increase the voltage, lies within the predetermined range.

22. An information processing apparatus according to claim 21, wherein the clock control judging device, if a plurality of frequencies as the effective frequency lie within the predetermined range, is operable to output a lowest decreasing command for decreasing the clock frequency down to a lowest one of the plurality of frequencies to the clock controller.

23. An information processing apparatus according to claim 4, wherein the clock control judging device is operable to:

predict a low-speed nonspecific processing time, which is a low-speed time up to a start of a next specific processing section when the clock frequency is decreased within a predetermined range, based on a previous processing time required for a previous processing other than the specific processing if the specific processing section detector has detected the end of the specific processing section, and output a decreasing command for decreasing the clock frequency to an effective frequency to the clock controller when the effective frequency, at which the predicted low-speed nonspecific processing time is longer than a threshold value dependent on and equal to or longer than a frequency-changing time required for the clock controller to decrease and increase the clock frequency, lies within the predetermined range.

24. An electrical apparatus comprising an information processing apparatus comprising:

a clock generator for generating a clock;

a clock controller for controlling the clock generated by the clock generator to determine a clock frequency;

a storage device for software;

a computing device for implementing the software obtained from the storage device in accordance with the clock supplied via the clock controller;

a specific processing section detector for detecting a start and an end of a specific processing section which is a section during which a predetermined specific processing is executed; and a clock control judging device for outputting a command to control the clock frequency to the clock controller in accordance with a result obtained by the specific processing section detector, wherein the specific processing section detector is operable to detect the start of the specific processing section upon entering the specific processing section from a normal processing section during which the specific processing is not executed and the end of the specific processing section upon returning from the specific processing section to the normal processing section, and the clock control judging device is operable to command the clock controller to increase the clock frequency if the specific processing section detector has detected the start of the specific processing section and command the clock controller to decrease the clock frequency if the specific processing section detector has detected the end of the specific processing section.

25. A clock controlling method for an information processing apparatus, the clock controlling method comprising:

a specific processing section detecting step of detecting a start and an end of a specific processing section which is a section during which a predetermined specific processing is executed; and a clock controlling step of increasing a clock frequency of the information processing apparatus when the start of the specific processing section is detected in the specific processing section detecting step and decreasing the clock frequency when the end of the specific processing section is detected in the specific processing section detecting step, wherein the specific processing section detecting step includes a step of detecting the start of the specific processing section upon entering the specific processing section from a normal processing section during which the specific processing is not executed and the end of the specific processing section upon returning from the specific processing section to the normal processing section.

26. A clock controlling program stored on a storage medium for use in an information processing apparatus the clock controlling program comprising:

a specific processing section detecting function of detecting a start and an end of a specific processing section which is a section during which a predetermined specific processing is executed; and a clock controlling function of increasing a clock frequency of the information processing apparatus when the start of the specific processing section is detected in the specific processing section detecting function and decreasing the clock frequency when the end of the specific processing section is detected in the specific processing section detecting function, wherein the specific processing section detecting function includes a function of detecting the start of the specific processing section upon entering the specific processing section from a normal processing section during which the specific processing is not executed and the end of the specific processing section upon returning from the specific processing section to the normal processing section.

* * * * *